United States Patent [19]

Tsunefuji

[11] Patent Number: 5,389,983
[45] Date of Patent: Feb. 14, 1995

[54] CAMERA

[75] Inventor: Katsuhiko Tsunefuji, Sagamihara, Japan

[73] Assignee: Olympus Optical Co., Ltd., Tokyo, Japan

[21] Appl. No.: 925,558

[22] Filed: Aug. 4, 1992

[30] Foreign Application Priority Data

| Aug. 15, 1991 | [JP] | Japan | 3-205163 |
| Sep. 17, 1991 | [JP] | Japan | 3-236623 |
| Nov. 25, 1991 | [JP] | Japan | 3-309335 |

[51] Int. Cl.$^6$ .......... G03B 7/00; G03B 17/26; G03B 17/02; G03B 13/10
[52] U.S. Cl. .......... 354/21; 354/275; 354/159; 354/222
[58] Field of Search .......... 354/21, 275, 159, 222

[56] References Cited

U.S. PATENT DOCUMENTS

| 4,579,432 | 4/1986 | Kobayashi | 354/21 |
| 4,597,653 | 7/1986 | Seeley et al. | 354/21 |
| 4,650,304 | 3/1987 | Harvey | 354/21 |
| 4,685,786 | 8/1987 | Iida et al. | 354/21 |
| 4,987,431 | 1/1991 | Harvey | 354/21 |
| 4,994,844 | 2/1991 | Azuma et al. | 354/474 |
| 5,049,908 | 9/1991 | Murakami | 354/21 |

FOREIGN PATENT DOCUMENTS

| 36-14234 | of 1961 | Japan . |
| 2540 | of 1969 | Japan . |
| 56-36229 | of 1981 | Japan . |
| 57-202524 | of 1982 | Japan . |
| 58-142324 | of 1983 | Japan . |
| 59-188623 | of 1984 | Japan . |

*Primary Examiner*—Michael L. Gellner
*Assistant Examiner*—Jae N. Noh
*Attorney, Agent, or Firm*—Louis Weinstein

[57] ABSTRACT

According to the present invention, a film cartridge has a display code that represents information of a built-in film using a pattern of electrodes set in array an, wherein information in addition the film sensitivity, number of permissible exposures, and latitude is displayed depending on whether the display code provides a pattern in which one of earth electrodes in two arrays of electrodes is nonconducting or a pattern in which the other earth electrode is conducting. A camera using the film cartridge changes photographic screen sizes according to identification information of the film when the film cartridge is mounted in the camera body.

6 Claims, 16 Drawing Sheets

CAMERA

BACKGROUND OF THE INVENTION

1. Field of the Invention

The present invention relates to a film cartridge and a camera. More particularly, this invention is concerned with a film cartridge having a display code that represents information of a built-in film using a pattern of electrodes set in array, and a camera using the film cartridge.

2. Description of the Related Art

As far as a roll film to be encased in a film cartridge is concerned, a means for identifying the type of the film has been proposed in Japanese Patent Laid-Open No. 57-202524 in the past. Herein, a code representing the sensitivity of the film is displayed on the outer surface of the film cartridge. By detecting the code, a film sensitivity suitable for the film is set automatically.

FIG. 1 shows an example of a DX code 53a displayed on an existing JIS 135-size film cartridge 53 for storing a perforated normal film 52a. The leader of the normal film 52a is pulled out. The DX code 53a has electrodes set in array. The electrodes L1 to L12 fall into conductors and insulators. The conductors are formed by baring the metal base of the circumferential surface of the film cartridge 53. The insulators are formed by coating the metal base with an insulating material. In FIG. 1, areas shown in black represent insulators. The detailed dimensions of the normal film are shown in FIGS. 25a and 25b, and listed in Table 1.

TABLE 1

| Symbol | Dimension (mm) |
|---|---|
| A1 | 35 |
| B1 | 4.75 |
| C1 | 2.8 |
| D1 | 1.98 |
| E1 | 2.0 |
| F1 | 25.4 |
| R1 | 0.5 |

Tolerances are omitted.

In the foregoing DX code 53a, the electrodes L1 and L7 are provided as earth electrodes. Continuity to the electrode L1 or L7 is detecting in each of the other electrodes (L2 to L6 and L8 to L12), thus acquiring film information the electrodes provide.

Table 2 presented below lists codes formed with electrodes L2 to L6 and identifying film sensitivities. Table 3 lists codes formed with electrode areas L8 to L10 and identifying numbers of film frames. Table 4 lists codes formed with electrode areas L11 and L12 and identifying permissible film latitudes.

TABLE 2

| ISO film sensitivity | Electrode area | | | | |
|---|---|---|---|---|---|
| | 2 | 3 | 4 | 5 | 6 |
| 25 | — | — | — | 0 | — |
| 32 | — | — | — | — | 0 |
| 40 | — | — | — | 0 | 0 |
| 50 | 0 | — | — | 0 | — |
| 64 | 0 | — | — | — | 0 |
| 80 | 0 | — | — | 0 | 0 |
| 100 | — | 0 | — | — | 0 |
| 125 | — | 0 | — | — | 0 |
| 160 | — | 0 | — | 0 | 0 |
| 200 | 0 | 0 | — | 0 | — |
| 250 | 0 | 0 | — | — | 0 |
| 320 | 0 | 0 | — | 0 | 0 |
| 400 | — | — | 0 | 0 | — |

TABLE 2-continued

| ISO film sensitivity | Electrode area | | | | |
|---|---|---|---|---|---|
| | 2 | 3 | 4 | 5 | 6 |
| 500 | — | — | 0 | — | 0 |
| 640 | — | — | 0 | 0 | 0 |
| 800 | 0 | — | 0 | 0 | — |
| 1000 | 0 | — | 0 | — | 0 |
| 1250 | 0 | — | 0 | 0 | 0 |
| 1600 | — | 0 | 0 | 0 | — |
| 2000 | — | 0 | 0 | — | 0 |
| 2500 | — | 0 | 0 | 0 | 0 |
| 3200 | 0 | 0 | 0 | 0 | — |
| 4000 | 0 | 0 | 0 | — | 0 |
| 5000 | 0 | 0 | 0 | 0 | 0 |

TABLE 3

| Number of permissible exposures | Electrode area | | |
|---|---|---|---|
| | 8 | 9 | 10 |
| 12 | 0 | — | — |
| 20 | — | 0 | — |
| 24 | 0 | 0 | — |
| 36 | — | — | 0 |

TABLE 4

| Latitude | Electrode area | |
|---|---|---|
| | 11 | 12 |
| +1/2 | — | — |
| +1 | 0 | — |
| +2, −1 | — | 0 |
| +3, −1 | 0 | 0 |

In Tables 2 to 4, a circle (o) indicates that the electrode is conducting electricity to the electrode L1 or L7. — indicates that the electrode is not conducting electricity to the electrode L1 or L7. In an example of a film cartridge 53 of FIG. 1, the information specified with the electrodes L2 to L6 and L8 to L12 reveals that the film in the film cartridge 53 has a sensitivity of ISO 100, permits 24 exposures, and provides a latitude of +2/−1.

Japanese Patent Laid-Open No. 2-21570 has disclosed a camera in which two contacts are brought into contact with areas on a film cartridge 53 that correspond to earth electrodes of a DX code 53a simultaneously, and thus whether or not the film cartridge 53 has the DX code 53a is determined.

In Japanese Patent Laid-Open No. 56-36629, when a film cartridge 53 is mounted, the structure of a spool of the film cartridge is checked for any differences (depths of engagement holes formed on the spool). Then, the type of film stored in the film cartridge, and, for example, an ASA sensitivity of the film are identified, then exposure control is performed on the camera automatically.

In Japanese Patent Laid-Open No. 44-2540, an irregular section for setting a film sensitivity is formed on the outer surface of a film cartridge. The sensitivity of a film in the film cartridge is identified by detecting the irregular section, similar to the proposal of the Japanese Patent Laid-Open No. 56-36629. Then, exposure control is performed on the camera automatically.

On the other hand, a well-known camera that employs a roll film and switches photographic screen sizes has been disclosed in Japanese Patent Laid-Open No. 36-14234. The camera switches masking plates for photographic screens and sizes of a finder window simultaneously. Using the same camera, photographic screen sizes can be changed any time externally according to the purposes of photography and photographs can be taken. The spacing of photographic screens is made constant, and a shape of each photographic screen is displayed on the finder window.

Japanese Patent Laid-Open No. 58-142324 has disclosed a large-size camera designed for a Brownie film and capable of using a 135-size film. Herein, a film advancing drive to be operated using an advancing lever formed on a camera body is installed in the camera body so that a film take-up for the Brownie film and a film take-up for a 135-size film cartridge can be switched freely. In addition, a film advancing mechanism interlocked with the film advancing drive is incorporated in each of the Brownie film take-up and 135-size film cartridge take-up.

Japanese Patent Laid-Open No. 59-188623 has disclosed a film counter for a camera in which the information of the number of film frames recorded on the outer circumferential surface of a film cartridge is read to display the number of remaining film frames and the number of exposed film frames. Herein, the information of the number of film frames recorded on a film cartridge mounted in a camera is read electrically, and the read information is converted into the number of film frames and stored. A certain value is subtracted from the number of film frames every time a shutter is actuated, then the result of the subtraction is displayed.

A film encased in a 135-size film cartridge has perforations on its sides as stipulated in JIS Standard K7519-1982 "135-size Film Cartridge" or ISO Standard 1007 "Photography 135-size Film and Magazine Specification." Due to the presence of the perforations, only 25.4 mm is ensured as an effective photographic width for a film width of 35 mm. Therefore, as stipulated in JIS Standard B7115, the standard photographic screen size becomes 24 mm by 36 mm. The effective use rate in the direction orthogonal to the film feeding direction is given as 0.69 or a quotient of 24 by 35, which is smaller than 70%. Therefore, unlike photographs taken at a high effective use rate at which the width of a photographic screen is increased fully within a film width of 35 mm, photographs taken in the standard photographic screen size require higher enlargement ratios for printing. Thereby, the quality of print images deteriorates.

The perforations are designed for intermittent feeding of cinefilm, which are, therefore, not always required for normal still cameras. Then, when the perforations are abandoned to increase a photographic screen size, an enlargement ratio for printing can be reduced to provide high-quality print images.

However, when perforations are abandoned to produce an imperforated film, some measure must be taken to differentiate a perforated film from an imperforated film. Then, employment of an existing DX code 53a (See FIG. 1) has been devised.

However, in the existing DX code 53a, all electrodes have their assignments and cannot represent any other identification information. The DX code 53a is designed to represent the number of permissible film exposures on the assumption that a standard screen size of 24 mm by 36 mm is adopted (See FIG. 3). The film counter described in the Japanese Patent Laid-Open No. 59-188623 counts exposed film frames on a basis of the standard screen size. When photographic screens are enlarged, or especially, made wider than standard screens, and exposed, even if the film counter is used to display the number of exposed frames, it fails to display the number of remaining unexposed frames correctly.

In the existing DX code 53a, both electrodes L1 and L7 are established as earth electrodes. However, a function as an earth electrode is required only at one point. Therefore, either the electrode L1 or L7 need work as an earth electrode.

On the other hand, in any of conventional cameras capable of switching photographic screen sizes, photographic screens are switched manually and the switching mechanism is complex. As for a photographic screen switching means described in the Japanese Patent Laid-Open No. 36-14232, when a 135-size film cartridge is employed, photographic screens can merely be changed from a standard size of 24 mm ×36 mm to a half size of 24 mm by 18 mm; that is, the size of each photographic screen can merely be changed in the film feeding direction. The length in the direction orthogonal to the film feeding direction cannot be changed. This means that small photographic screens or photographic screens of the half size can be provided and exposed easily. However, it is hard to provide photographic screens larger than the standard size, because enlargement can be done only in the feeding direction.

The art disclosed in the Japanese Patent Laid-Open No. 58-142324 is restricted to large-size cameras using a Brownie film or other large-sized film but cannot apply to cameras supporting only a 135-size film cartridge. Changing photographic screen sizes means loading different films of different sizes. When only, for example, a 135-size film cartridge is in use, photographic screens cannot be changed.

OBJECTS AND SUMMARY OF THE INVENTION

The first object of the present invention is to propose a roll film in which perforations are abandoned, and provide a film cartridge providing identification information for identifying a perforated film from an imperforated film as information other than a film sensitivity, the number of permissible exposures, and a latitude.

The second object of the present invention is to provide a camera using a film cartridge in which, when a film loaded in a camera body is perforated, photography is done in a conventional standard photographic screen size, and when a film loaded is imperforated, photography is done in a photographic screen size larger than the standard photographic screen size.

The third object of the present invention is to provide a camera capable of correcting and displaying the number of permissible exposures that permits a photographic screen size larger than the standard photographic screen size.

To be brief, according to the present invention, a film cartridge has a display code that represents information of a film loaded using a pattern specified with electrodes set in an array, and displays information other than a film sensitivity, the number of permissible exposures, and a latitude depending on whether the display code provides either a pattern in which one of earth electrodes in two arrays of electrodes is non-conducting or a pattern in which the other earth electrode is conducting. A camera using the film cartridge changes photographic screen sizes according to the identification information of the film, when the film cartridge is mounted in the camera body.

The objects and advantages of the present invention will be further apparent from the detailed description below.

DETAILED DESCRIPTION OF THE PREFERRED EMBODIMENTS

The present invention will be described specifically in conjunction with the drawings.

First, prior to embodiments of a photographic screen size switching camera of the present invention, embodiments of a film cartridge of the present invention will be described in conjunction with the drawings.

Figure 2:
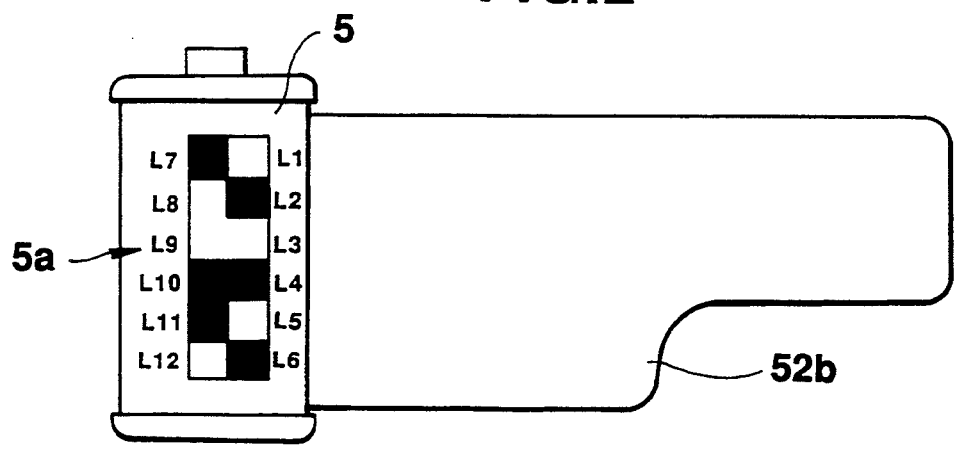
FIG. 2 is a front view showing a film cartridge for storing an imperforated film of 35 mm wide and a DX code on the film cartridge in one embodiment according to the present invention.

FIG. 2 shows an example of a film cartridge 5 according to the present invention.

Figure 1:
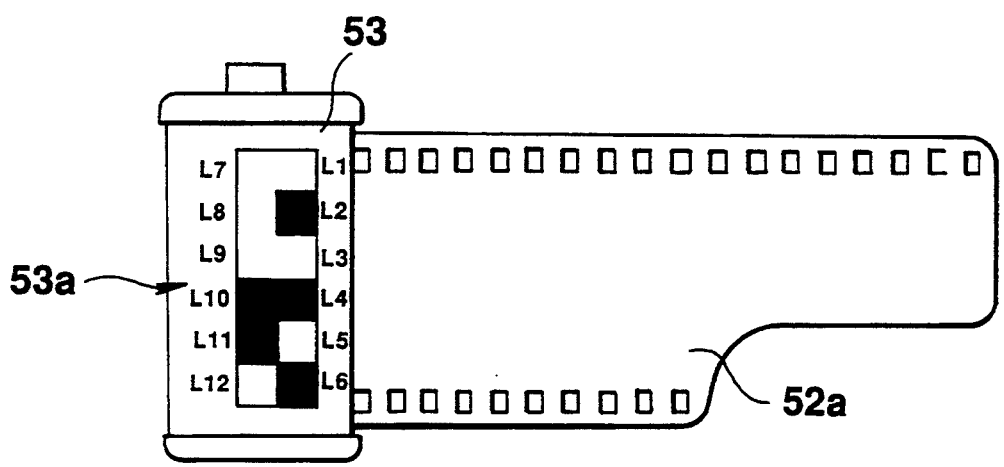
FIG. 1 is a front view showing a film cartridge for storing an existing perforated film of 35 mm wide and a DX code on the film cartridge.

The film cartridge 5 has the same dimensions as an existing 135-size film cartridge 53 (See FIG. 1) that accommodates a normal film 52a and has a DX code 53a, and includes a DX code 5a arranged identically to the DX code 53. However, the DX code 5a has a different role from the DX code 53. In the film cartridge 5, a 35 mm-wide imperforated film 52a for large-screen photography is stored. In FIG. 2, the leader of the film 52b is pulled out from the film cartridge 5.

The DX code section 5a has, similarly to the DX code 53a, electrodes L1 to L12 or arrays of electrodes. The electrodes L1 to L12 fall into conductors and insulators. The conductors are formed by baring the circumferential metal base of the film cartridge 5. The insulators are formed by coating the metal base. In FIG. 2, areas painted in black represent insulators.

In the DX code 5a, an electrode L7 is formed with an insulator. The underlying idea is that electrodes L1 and L7 of the existing DX code 53a are established as earth electrodes, or formed as conductors (See FIG. 1), then when the film cartridge 53 has the DX code 53a, only the electrode L1 can be used as an earth electrode and the electrode L7 can be used to provide an identification code. Thereby, information other than a film sensitivity, the number of permissible exposures, and a latitude can be displayed on the film cartridge.

In this embodiment, what the electrode L7 identifies is the presence or absence of perforations in a film stored in the film cartridge 5. (Hereafter, the imperforated film 52a is referred to as an A-type film.)

The electrodes L2 to L6 and L8 to L12 in the DX code 5a have the same roles as those in the DX code 53a. Therefore, the film cartridge shown in FIG. 2 contains an A-type film or an imperforated film having a sensitivity of ISO 100, permitting 24 exposures, and providing a latitude of +2/−1.

Table 5 lists the relationships between film types (normal and A-type) and states of electrodes when the electrode L7 is used to provide an identification code defining the presence or absence of perforations in a film stored in a film cartridge mounted.

TABLE 5

| Film type | Contact area | |
|---|---|---|
| | 1 | 7 |
| Normal | 0 | 0 |
| A type | 0 | — |

Next, the first embodiment of a photographic screen size switching camera of the present invention, which uses a film cartridge 5 having a DX code 5a, will be described in conjunction with the drawings.

Figure 3:
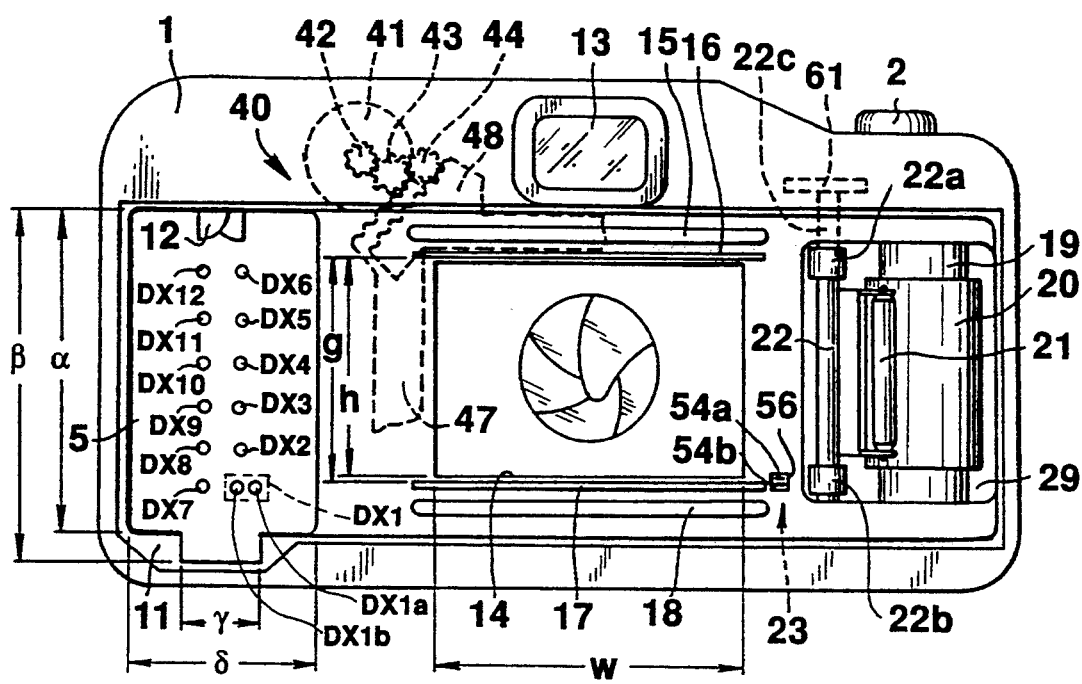
FIG. 3 is a back view of a photographic screen size switching camera of the first embodiment of the present invention.

FIG. 3 is a back view of a photographic screen size switching camera of the first embodiment according to the present invention. The back cover is removed.

Figure 4:
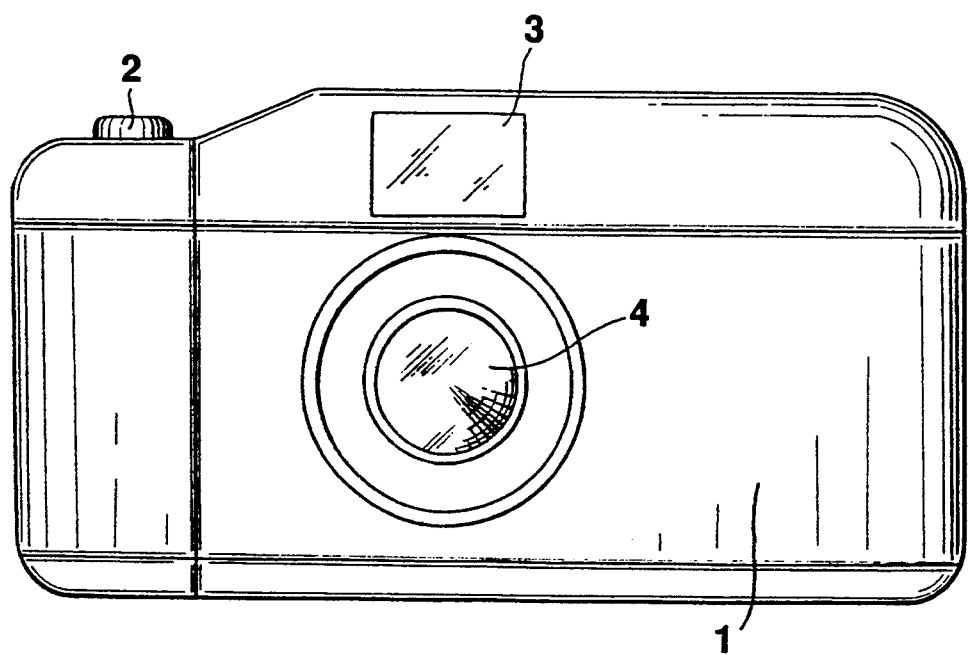
FIG. 4 is a front view of the photographic screen size switching camera in the first embodiment.

The camera includes normal photographic functions as well as the functions derived from the configuration described below. For example, as shown in the front view of FIG. 4, a release button 2 formed on one side of the top of a camera body 1, a photographic lens 4 formed in the front center of the camera body 1, and a finder window 3 formed above the photographic lens 4 have the same functions as those in a normal camera. The photographic lens 4 has a larger image circle than that in a normal camera for the reasons to be described later.

As shown in FIG. 3, in a cartridge mounting chamber 11 serving as a film feeding chamber, a film cartridge 5 (whose dimensions are identical to those of a 135-size film cartridge defined in JIS K7519, and whose outline is indicated with a solid line with dimensions α, β, γ, and δ.) can be mounted as shown in FIG. 3. The dimensions α, β, γ, and δ represent the values listed in Table 6.

TABLE 6

| Symbol | Maximum | Minimum |
|---|---|---|
| α | 44.4 | 42.4 |
| β | 48.0 | 46.9 |
| γ | 11.4 | — |
| δ | 25.3 | 24.9 |

Unit: mm

Figure 11:
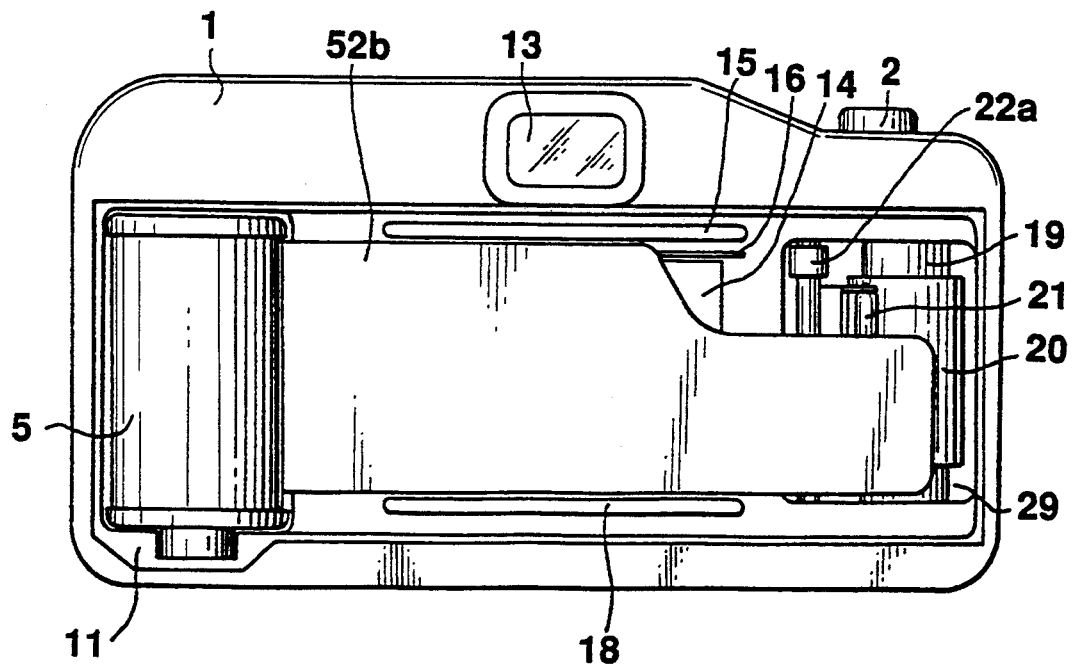
FIG. 11 is a back view of the camera with an imperforated film shown in FIG. 2 loaded.

Contacts DX1 to DX12 for reading the DX code 5a are arranged longitudinally along the center line on the wall of the cartridge mounting chamber 1 on the front of the camera body 1. These contacts DX1 to DX12 are conducting. When the film cartridge 5 having the DX code 5a is mounted in the camera body 1 as shown in FIG. 11, the contacts DX1 to DX12 are brought into contact with the electrodes L1 to L12 of the DX code 5a.

Only the contact DX1 comprises two contacts of DX1a and DX1b, which are adjacent to each other. This is intended to determine whether a film cartridge mounted in the cartridge mounting chamber 11 has a DX code 5a. Owing to the DX1a and DX1b, it can be determined whether the electrode L1 of the DX code 5a is conducting or insulated. That is to say, when the DX1a and DX1b conduct electricity, the film cartridge mounted has the DX code 5a. When the DX1a and DX1b are non-conducting, the film cartridge is regarded as a film cartridge not having the DX code.

On the other hand, on the ceiling of the film cartridge mounting chamber 11, a fork 12 for electrically rewinding the film in the film cartridge 5 is formed. The fork 12 is driven with a motor (not shown). A finder eyepiece 13 is located on the top center on the back of the camera body 1, serving as an eyepiece for a finder optical system 30 to be described later (See FIG. 6).

Then, a mask 14 for defining a photographic screen is formed on the back center of the camera body 1. In the first embodiment, the mask 14 is, for example, 29 mm high and 40.85 mm wide. The mask 14 provides a photographic screen having a size similar to an ISO A-type paper size and an aspect ratio of 1:√2. With the above height and width, the diagonal length of each photographic screen becomes about 50.0 mm or larger than that of a conventional photographic screen, about 43.3 mm. Therefore, the photographic lens 4 has a larger image circle than that of a normal camera.

In the first embodiment, as described previously, the photographic screen size is similar to an A-type paper size or determined to have an aspect ratio of 1:√2. The aspect ratio is not limited to 1:√2 but may be set to any value that specifies a letter size, a legal size, or other paper size generally employed in the U.S., or other paper size adopted in overseas countries.

Inside the mask 14 in the camera body 1, a photographic screen mask switching mechanism 40 is installed. The photographic screen mask switching mechanism 40 switches photographic screens.

Above and beneath the mask 14, film rails 15, 16, 17, and 18 are running in the film feeding direction. Outer film rails 15 and 18, or inner film rails 16 and 17 share the same rail plane.

Figure 5:
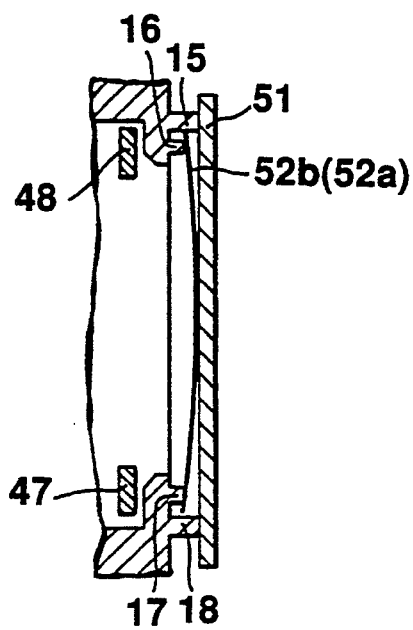
FIG. 5 is a cross-sectional diagram of a mask shown in FIG. 3.

FIG. 5 shows longitudinal cross sections of film rails 15, 16, 17, and 18. In FIG. 5, a film 52b (52a) stored in a film cartridge 5 is pulled out and stretched, then a back cover that is not shown is closed. A film platen 51 located inside the back cover has, as disclosed already, the inner surfaces of its upper and lower edges pressed on the fronts of the film rails 15 and 18. The film platen 51 presses the center of the film to even the film. A film guide for feeding the film 52b (52a) smoothly is placed between the inside of the film platen 51 and the fronts of the film rails 16 and 17. The distance g between the insides of the film rails 15 and 18 (See FIG. 3) is slightly larger than a film width or 35 mm similar to that in a normal camera. This facilitates efficiency in sliding the film.

In FIG. 3, a film take-up chamber 29 is formed on the other side of the cartridge mounting chamber 11 with respect to the mask 14. A film advancing spool 19 of the same type as that of a spool for a normal camera lies in the film take-up chamber 29. A rubber belt 20 having a large frictional force is wound around the center part of the spool 19, so that even an imperforated film can be loaded reliably.

Then, the spool 19 rotates automatically in a given direction, and advances the leader of a film or one exposed film frame during photography. That is to say, after a film cartridge 5 is mounted in the cartridge mounting chamber 11 and the leader of a film is positioned properly, when a back cover (not shown) is closed, a back cover switch to be described later (See FIG. 16) is turned on. At the same time, a built-in advancing/rewinding motor 108 is controlled by a film advancing/rewinding drive circuit 107 (See FIG. 16) that operates in response to an instruction from a CPU 101 (See FIG. 16), and drives the spool 19.

An assistant roller 21 held by assistant roller arms 71 and 71b (See FIG. 12) having their proximal portions locked in the camera body in such a way that they can swing freely is joined with the rubber belt 20 of the spool 19 so that the surface of the roller can be brought into contact with the surface of the rubber belt 20. The assistant roller 21 assists the spool 19 in rotating and thus winding up a film 52b (52a) to be loaded.

A film feed detection roller axle 22 is located in parallel with the spool 19 on the side of the mask 14 in the vicinity of the assistant roller 21. Detection rollers 22a and 22b made of rubber having a large frictional force are attached to the upper and lower parts of the film feed detection roller axle 22. The detection rollers 22a and 22b press the inner surfaces of the upper and lower parts of the film 52b (52a) when the film is loaded, and rotates with loading of the film.

Therefore, the film feed detection roller axle 22 rotates according to a feed of the film 52b (52a). Then, a rotary disk 61 of a pulse generation mechanism for film feed detection 60, which will be described later, is fixed on the upper part 22c of the detection roller axle 22 extending in the camera body 1. Thereby, a pulse signal is generated according to a quantity of rotation of the film feed detection roller axle 22. Using the pulse signal, the CPU 101 measures a film feed.

A perforation detection switch 23 is formed adjoining the mask 14 in the vicinity of the detection roller 22b on the lower part of the film feed detection roller axle 22. The perforation detection switch 23 is a contact switch that conducts electricity through perforations to supply pulses to a film feed switching means 85 and a film feed counting means 86. On the wall 55 of the camera body between the detection roller 22 and mask 14, a through hole 56 is bored at a given position at which perforations pass when a perforated film 52 is loaded. Contacts of contact springs 54a and 54b constituting part of the perforation detection switch 23 are arranged in the through hole 56.

Figure 6:
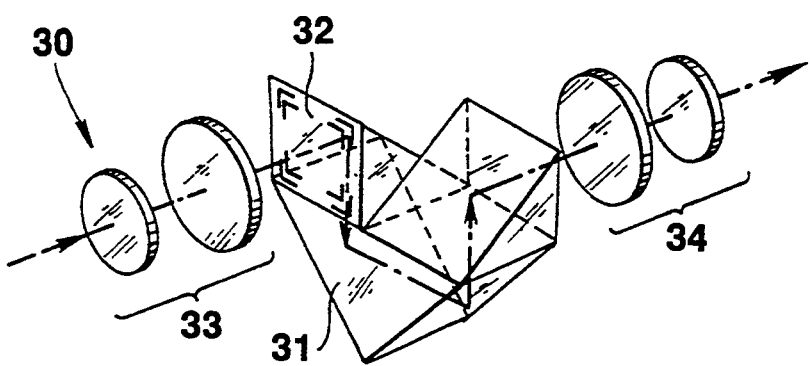
FIG. 6 is a perspective view of a finder optical system employed in the camera of the first embodiment.

FIG. 6 is a perspective view showing a configuration of a finder optical system 30 capable of changing field frame sizes.

Figure 7A:
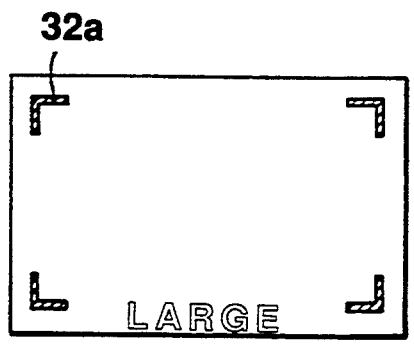
FIG. 7a shows a finder field frame in the camera of the first embodiment for large-screen photography.
Figure 7B:
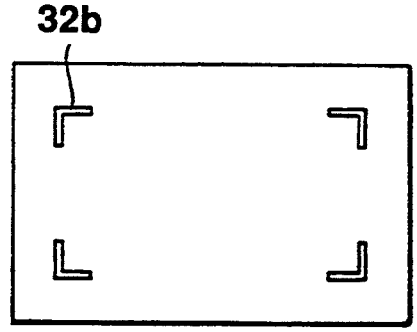
FIG. 7b is a front view of the field frame for normal photography.

The optical system is formed with a real image type finder optical system made up of objectives 33, a Porro prism 31, and eyepieces 34. A transmission type liquid crystal plate 32 capable of displaying a large-screen field frame 32a and a normal-screen field frame 32b is placed on the incident plane of the Porro prism 31. The field frames can be switched electrically. The large-screen field frame 32a and normal-screen field frame 32b appear as shown in FIGS. 7a and 7b.

Switching displays on the transmission type liquid crystal plate 32 is controlled by a finder frame switching liquid crystal drive circuit 106 (See FIG. 16) that operates in response to an instruction from the CPU 101.

Figure 8:
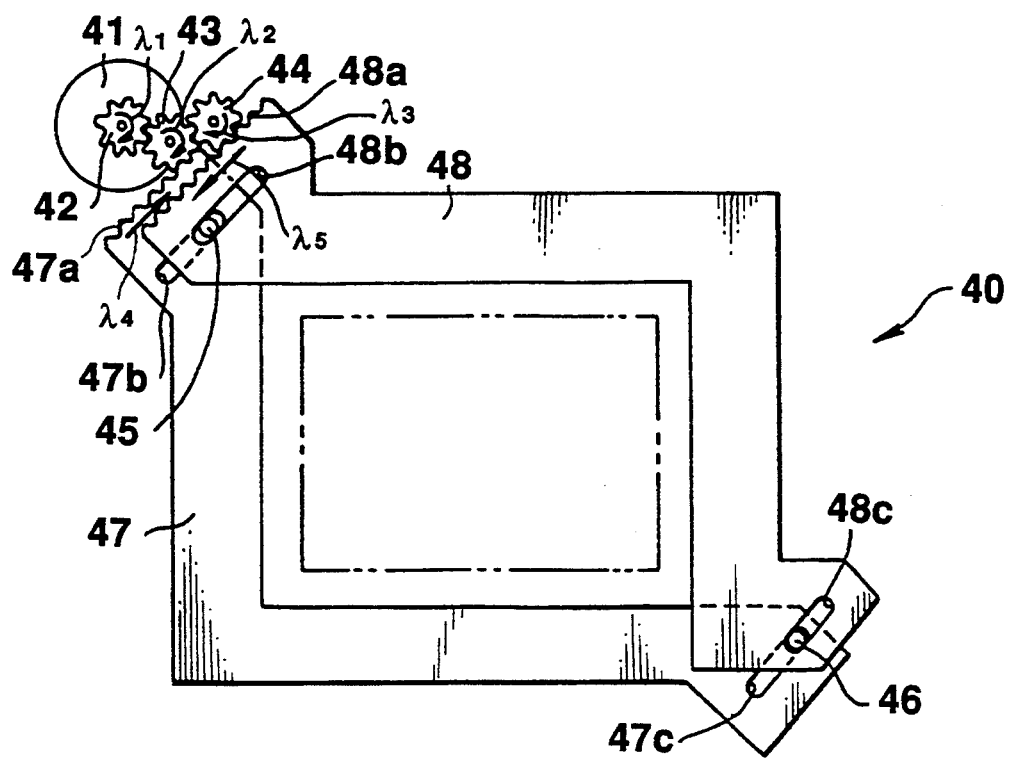
FIG. 8 is a front view of a photographic screen mask switching mechanism in the camera of the first embodiment.

FIG. 8 shows a configuration of a photographic screen mask switching mechanism 40. The mask switching mechanism 40 is formed in a camera body 1, and switches large-screen and normal-screen mask sizes when a screen size switching motor 41 (See FIG. 16) is actuated.

The rotation of the screen size switching motor 41 is controlled by a screen size switching motor drive circuit 104 (See FIG. 16) that operates in response to an instruction from a CPU 101. An output gear 42 of the switching motor 41 is engaged with a pinion 43 in such a way that the output gear 42 can rotate freely. The pinion 43 is engaged with a pinion 44 to be movable freely. The pinions 43 and 44 drive masking frames 47 and 48 that are L-shaped frame plates and opposed to each other. The masking frames 47 and 48 move in their respective diagonal directions to change their positions.

To be more specific, the diagonally opposed ends of each of the masking frames 47 and 48 extend in the diagonal direction. Racks 47a and 48a are formed on the ends extending upward. The racks 47a and 48a respectively engage the pinions 43 and 44. Elongated guide holes 47b and 48b, and 47c and 48c are bored in the extensions on the diagonals of the masking frames 47 and 48. The elongated guide holes are fitted to receive guide pins 45 and 46.

In the photographic screen mask switching mechanism 40 having the aforesaid configuration, when the screen size switching motor 41 rotates in the arrow $\lambda 1$ direction, the pinions 43 and 44 rotate in the arrows $\lambda 2$ and $\lambda 3$ directions, and the racks 47a and 48a on the masking frames 47 and 48 move in the arrows $\lambda 4$ and $\lambda 5$ directions. Thereby, the masking frames 47 and 48 move toward the optical axis of the taking lens inward to lessen the intra-frame area and thus produce a mask of a normal-screen size. When the screen size switching motor 41 rotates in the reverse direction of the arrow $\lambda 1$ direction, the masking frames 47 and 48 move reversely to the above directions or move to expand the intra-frame area. Thus, a mask of a large photographic screen size is produced.

Figure 9:
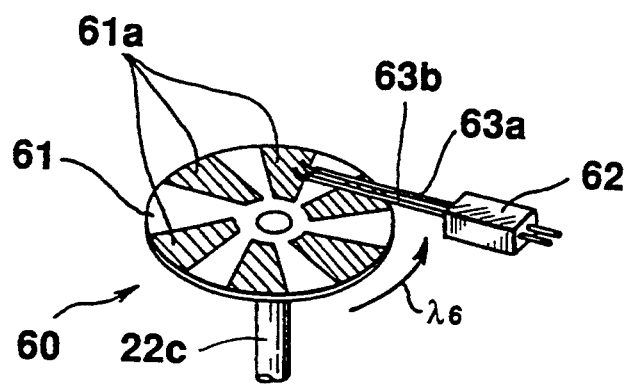
FIG. 9 is an oblique view of a main section of a pulse generation mechanism for film feed detection in the camera of the first embodiment.

FIG. 9 is an oblique view showing a configuration of a pulse generation mechanism 60 for film feed detection.

A rotary disk 61 uses an upper part 22c of a film feed detection roller axle 22 as a center axis, and rotates with the rotation of the film feed detection roller axle 22 or according to a film feed. On the top of the rotary disk 61, copper foil 61a or other conducting material is coated radially from the center axle at regular intervals as shown in FIG. 9. In the FIG. 9, six sheets of the copper foil 61a are adhered. This number of copper foil sheets, six, is determined for the reasons to be described later. The number of copper foil sheets is not limited to six but may be any value.

Figure 10:
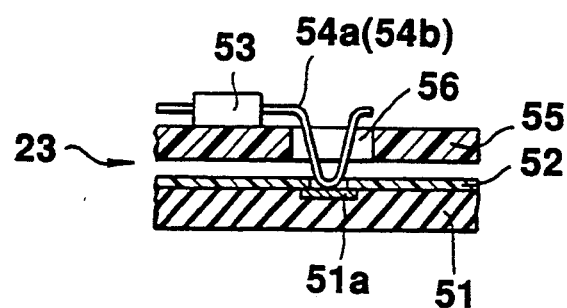
FIG. 10 shows an enlarged cross section of a perforation detection switch in the camera of the first embodiment.

On the top of the rotary disk 61, contact springs 63a and 63b whose proximal portions are locked in a contact spring support 62 fixed at a given position inside a camera body 1 are placed in parallel with a tangent of the rotary disk 61. The distal portions of the contact springs 63a and 63b are bent toward the top of the rotary disk 61, thus forming bends. The apices of the bends, similar to FIG. 10, are used as contacts, and opposed to the top of the rotary disk 61 so that the contacts will be in contact with the top of the rotary disk 61. The proximal ends of the contact springs 63a and 63b are connected to input pins P5 and P6 of CPU 101 (See FIG. 16), thus transmitting pulses generated when the contact springs 63a and 63b are short-circuited.

FIG. 10 shows an enlarged cross section of a main section of a perforation detection switch 23.

A film platen 51 is arranged inside a back cover (not shown) and serves as a film pressure plate as described previously. On the film platen 51, a conducting member 51a is resting. When a film 52 is perforated, every perforation faces the conducting member 51.

On the other hand, contact springs 54a and 54b are made of phosphor bronze or other elastic conductor, and have their proximal portions locked in a contact spring support 53 that is fixed at a given position in camera body 1. The distal portions of the contact springs 54a and 54b are bent toward the conducting member 51a to form bends. The bends penetrate through perforations 56 and reach the film platen 51. The apices of the bends serving as contacts are opposed to the conducting member 51a. The terminals of the contact springs 54a and 54b are connected to input pins P11 and P12 of the CPU 101 (See FIG. 16). When the contact springs 54a and 54b are short-circuited, pulses are supplied to the input pins P11 and P12.

Next, film loading for loading an imperforated film 52b stored in a film cartridge 5 mounted in a camera body 1 as shown in FIG. 11 will be described in conjunction with FIGS. 12 to 15.

FIGS. 12 to 15 are cross-sectional diagrams of a film take-up chamber 29 shown in FIG. 2, which show progressive steps of film loading in that order.

Figure 12:
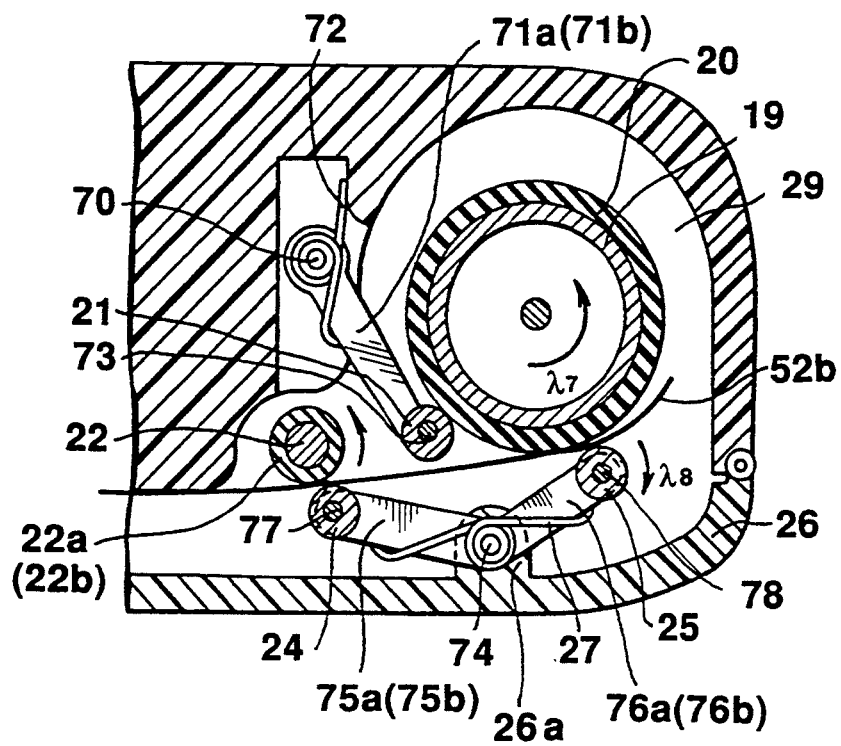
FIG. 12 is a cross-sectional diagram of a main section showing film loading in the camera of the first embodiment.

In FIG. 12, assistant roller arms 75a and 75b, and 76a and 76b have their proximal ends attached to a back cover 26 of a camera so that they can swing freely, and thus hold assistant rollers 24 and 25 in parallel with a spool 19. More particularly, the assistant roller arms 75a, 75b, 76a, and 76b have their proximal ends pivoted on a spindle 74 attached to a projection 26 or part of the back cover 26 that is projecting inward or into the film take-up chamber 29, so that they can swivel freely. Assistant rollers 24 and 25 are attached to spindles 77 and 78 placed between the distal ends of the assistant roller arms 75a and 75b, and 76a and 76b, so that they can rotate freely. Extending ends of a constraining spring 27 whose middle portion is wound around the spindle 74 are hooked on the assistant roller arms 75a and 75b. Thereby, the surface of the assistant roller 24 presses the film feed detection rollers 22a and 22b, and the other assistant roller 25 presses the rubber belt 20 of the spool 19. The assistant rollers 24 and 25 assist in loading the film 52b.

On the other hand, a recess is formed on the wall of the camera body beyond the spool 19, and an assistant roller 21 is held with assistant roller arms 71a and 71b. That is to say, the proximal portions of the assistant roller arms 71a and 71b are placed in the recess of the camera body 1, and pivoted on a spindle 70 so that the assistant roller arms 71a and 71b can rotate freely. Their distal portions extend between the spool 19 and film feed detection roller axle 22 in the film take-up chamber 29.

The assistant roller 21 is mounted on a spindle 73 that is installed in parallel with the spool 19 between the distal ends of the assistant roller arms 71a and 71b. A constraining spring 72 has its middle portion wound around the spindle 70, one of its ends hooked on the assistant roller arm 71a, and the other end hooked on the camera body 1. The constraining spring 72 brings the surface of the assistant roller 21 into contact with the rubber belt 20. The assistant roller 21 assists the spool in rotating and loading the film 52b.

Figure 13:
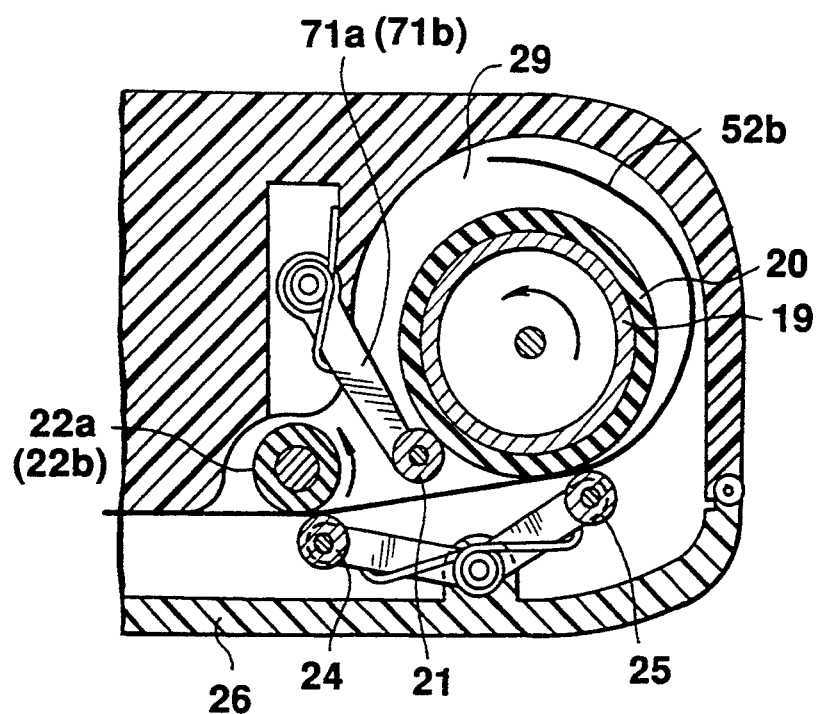
FIG. 13 is a cross-sectional diagram of a main section showing film loading in the camera of the first embodiment.
Figure 14:
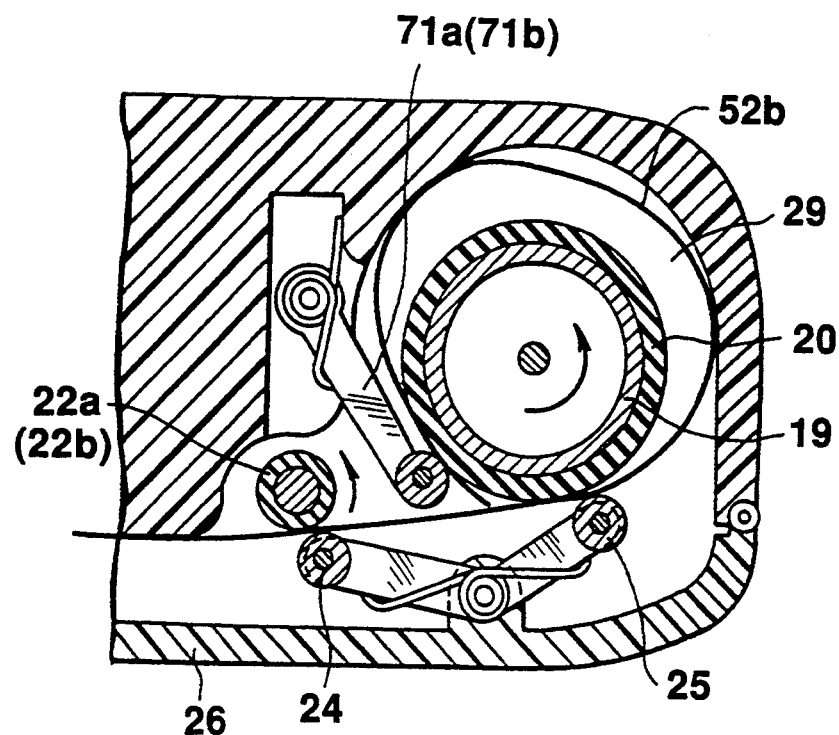
FIG. 14 is a cross-sectional diagram of a main section showing film loading in the camera of the first embodiment.

As shown in FIG. 11, a film cartridge 5 containing an imperforated film is mounted, the film 52b is pulled out and loaded, then a back cover 27 is closed. Then, the film 52b is located as shown in FIG. 12. That is to say, the film 52b has its distal portion caught between a rubber belt 20 wound around a spool 19 and an assistant roller 25 applying a pressing habit to the rubber belt 20. Then, when the back cover 26 is closed, as described later, a back cover switch 103 (See FIG. 16) is turned on (i.e. closed) to start loading. To be more specific, the spool 19 rotates in the arrow λ7 direction, and the rubber belt 20 and assistant roller 25 rotate in the directions of arrows λ7 and λ8. With the rotations, the film 52b is wound around the spool 19 as shown in FIGS. 13 and 14.

Figure 15:
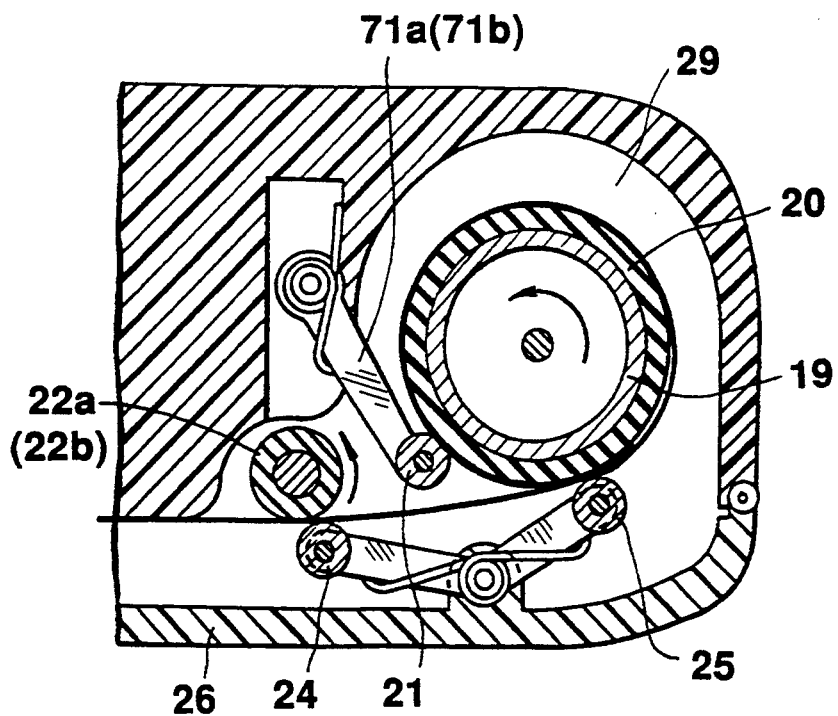
FIG. 15 is a cross-sectional diagram of a main section showing film loading in the camera of the first embodiment.

At this time or when the film 52b is loaded, CPU 101 checks the states of contacts DX1a to DX12 to read information of a DX code 5a, then identifies the type of the film 52b. A pulse generation mechanism for film feed detection 60 measures the feed of the film 52b. When the feed reaches a given value, loading is stopped and a release standby state is established. FIG. 15 shows the film in this state.

Figure 16:
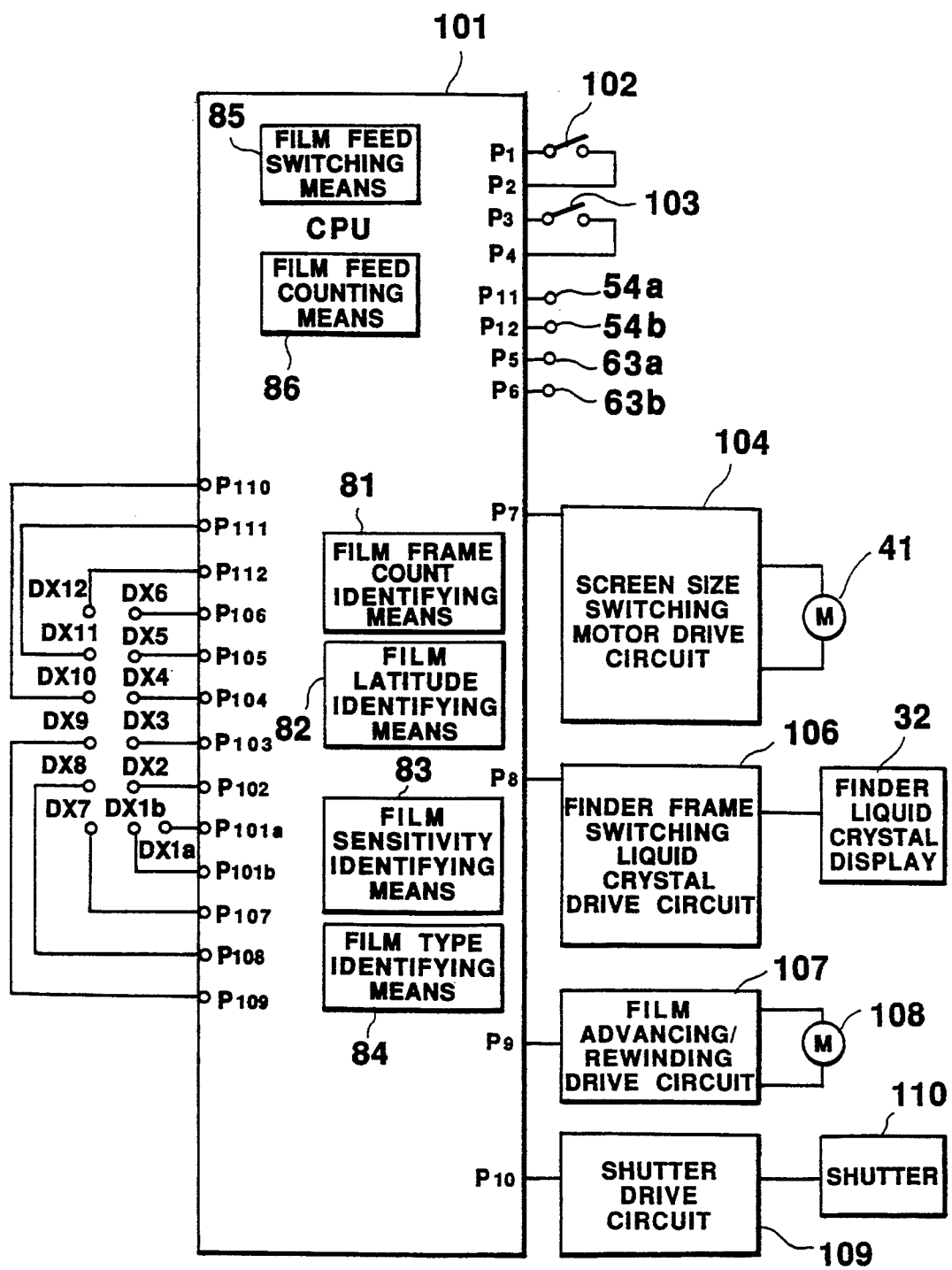
FIG. 16 is a block diagram showing a composition of electrical circuits in the camera of the first embodiment.

FIG. 16 is an electric circuit block diagram showing a composition of CPU 101 for controlling the operation of a camera of the first embodiment and its peripheral circuits.

The CPU 101 is a controller for controlling electric circuits in a camera in the first embodiment. A release switch 102 is connected to input pins P1 and P2, and a back cover switch 103 is connected to input pins P3 and P4. Switches formed with contact springs 63a and 63b are connected to input pins P11 and P12. Switches formed with contact springs 54a and 54b are connected to input pins P11 and P12. The CPU 101 always monitors signals entering the input pins. When given signals enter the input pins, the CPU 101 operates accordingly (as will be described later).

A screen size switching motor drive circuit 104, a finder frame switching liquid crystal drive circuit 106, a film advancing/rewinding drive circuit 107, and a shutter drive circuit 109 are connected to output pins P7, P8, P9, and P10 of the CPU 101. The CPU 101 processes the signals entering the input pins to control the above drive circuits.

The screen size switching motor drive circuit 104 has its output connected to a screen size switching motor 41 and thereby controls drive of the switching motor 41 as described previously. The finder frame switching liquid crystal drive circuit 106 has its output pin connected to a transmission type liquid crystal plate 32 and thereby controls screen display of the transmission type liquid crystal plate 32. The film advancing/rewinding drive circuit 107 has its output connected to a film advancing-/rewinding motor 108 and thereby controls drive of the motor 108. The shutter drive circuit 109 has its output pin connected to a shutter and thereby controls opening and closing of the shutter.

Incorporated in the CPU 101 are a film frame count identifying means 81 for identifying the number of film frames identifying means for identifying the number of film frames such as a value listed in Table 3 using code information acquired from a DX code 5a, a film latitude identifying means 82 for identifying a film latitude such as a value identifying means for identifying the number of film frames listed in Table 4, a film sensitivity identifying means 83 for identifying a film sensitivity such as a value listed in identifying means for identifying the number of film frames Table 2, and a film type identifying means 84 for identifying a film type such as a value listed in Table 5.

These identifying means are connected to the contacts DX1a to DX12 via the pins P101a to P112 of the CPU 101. That is to say, the contacts DX1a to DX12 are connected to the pins P101a to P112 as shown in FIG. 16. Among them, the contacts DX1a, DX1b, and DX7 are connected to the film type identifying means 84 via the pins P101a, P101b, and P107. The contacts DX2 to DX6 are connected to the film sensitivity identifying means 83 via the pins P102 to P106. The contacts DX8 to DX10 are connected to the film frame count identifying means 81 via the pins P108 to P110. The contacts DX11 and DX12 are connected to the film latitude identifying means 82 via the pins P111 and P112.

In the CPU 101, a film feed switching means 85 and a film feed counting means 86 are incorporated.

The film feed switching means 85 switches film feeds according to an output pulse signal from a perforation detection switch 23. To be more specific, the film feed switching means instructs the film feed counting means 86 to count pulses originating from the contact springs 54a and 54b so that feed control will be done according to an output pulse signal of the perforation detection switch 23. Alternatively, the film feed switching means instructs the film feed counting means 86 to count pulses originating from the contact springs 63a and 63b so that feed control will be done according to a pulse signal sent from the pulse generation mechanism for film feed detection 60.

Figure 19:
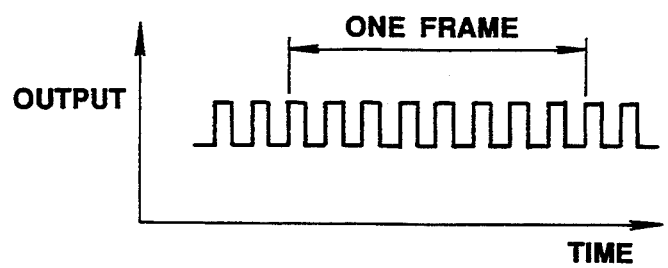
FIG. 19 shows a pulse signal generated with perforations of a film in the camera of the first embodiment.

The film feed counting means 86 controls drive of the film advancing/rewinding motor 108 according to an instruction from the film feed switching means 85, and thus controls a film feed. Then, the film feed counting means 86 instructs the film advancing/rewinding motor 108 so that when a film is perforated, the film advancing/rewinding motor 108 will count up one frame in units of eight pulses originating from the contact springs 54a and 54b as shown in FIG. 19. For an imperforated film, the film advancing/rewinding motor 108 is instructed to count up one frame in units of 18 pulses originating from the contact springs 63a and 63b, and advance the film with every count.

The specific procedure of the foregoing film feed control will be described in detail later.

Of the operation of a camera of the first embodiment having the aforesaid configuration, a process whereby a film type identifying means 84 identifies a film type will be described with reference to the flowchart of FIG. 17.

First, CPU 101 determines whether contacts DX1a and DX1b are conducting, and thereby becomes aware whether or not an electrode L1 of a DX code 5a on a film cartridge 5 mounted in a camera body 1 is conducting (step S21). At this step S21, if the contacts DX1a and DX1b are conducting, the film cartridge is thought to contain a DX film having a DX code (step S22). If the contacts DX1a and DX1b are non-conducting, the film cartridge is thought to contain a non-DX film not having a DX code (step S26).

After the step S22, the CPU 101 determines whether the contacts DX1a and DX7 are conducting or whether an electrode L7 is a conductor (step S23). At this step S23, if the electrode L7 is conducting, a normal DX film or a perforated normal film is identified (step S25). If the electrode L7 is an insulator, an A-type DX film or an imperforated film is identified (step S24).

Figure 18:
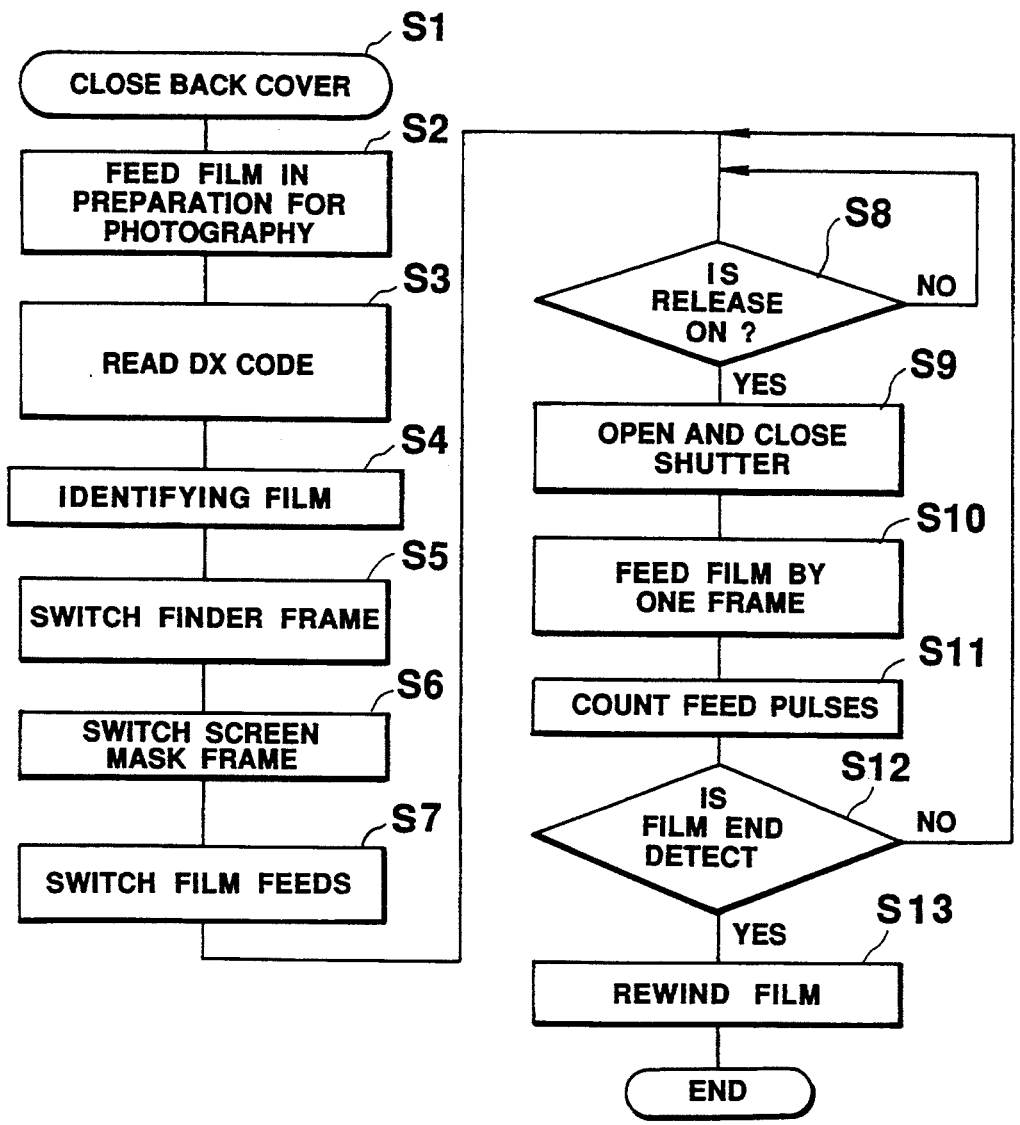
FIG. 18 is a flowchart showing operation of the camera of the first embodiment.

Next, the overall operation of a camera of the first embodiment having the aforesaid configuration will be described with reference to the flowchart of FIG. 18.

First, a film cartridge 5 is mounted in cartridge mounting chamber 11 of camera body 1, a film 52a is pulled out from the film cartridge 5 and set at a given position and, then a back cover is closed. Then, a back cover switch 103 is turned on to send an On signal to a CPU 110 (step S1). In response to the signal, the CPU 101 outputs a control signal via an output pin P9 (See FIG. 16). When receiving the control signal, a film advancing/rewinding drive circuit 107 rotates a film advancing/rewinding motor 108. Thus, feeding of the film 52a in preparation for photography starts (step S2).

In the meantime, the CPU 101 reads information of a DX code 5a on the film cartridge mounted (step S3). Then, as described previously, the film sensitivity, number of permissible exposures, and latitude of the film stored in the film cartridge, as well as the presence or absence of perforations are detected (See the flowchart of FIG. 17) (step S4).

In response to the results, the CPU 101 outputs a control signal via an output pin P8 (See FIG. 16) to actuate a finder frame switching liquid crystal drive circuit 106, and thus switches displays on a transmission type liquid crystal plate 32 (step S5). At the same time, the CPU 101 outputs a control signal via an output pin P7 (See FIG. 16) to actuate a screen size switching motor drive circuit 104, and thus rotates a screen size switching motor 41. Thus, the photographic screen size is set to a given value (step S6).

When a film is imperforated, the CPU 101 instructs to select the screen display shown in FIG. 7a for a transmission type liquid crystal plate 32, and to increase the size of a mask produced by a photographic screen mask switching mechanism 40 or more particularly to specify a mask size of 29 mm by 40.75 mm. On the other hand, when a perforated film 52 is loaded or when a normal film cartridge is mounted, the CPU 101 instructs to select the screen display shown in FIG. 7b for the transmission type liquid crystal plate 32, and to shrink the masking frames of the photographic screen mask switching mechanism 40 or more particularly to specify a mask size of 24 mm by 36 mm. Next, the CPU 101 instructs the film advancing/rewinding drive circuit 107 to count pulses originating from contact springs 54a and 54b as described previously so that feed control will be done according to an output pulse signal of a perforation detection switch 23. Alternatively, the CPU 101 instructs the film advancing/rewinding drive circuit 107 to count pulses originating from contact springs 63a and 63b so that feed control will be done according to a pulse signal sent from a pulse generation mechanism for film feed detection 60 (step S7).

Now, an example of setting a feed will be described.

Figure 20:
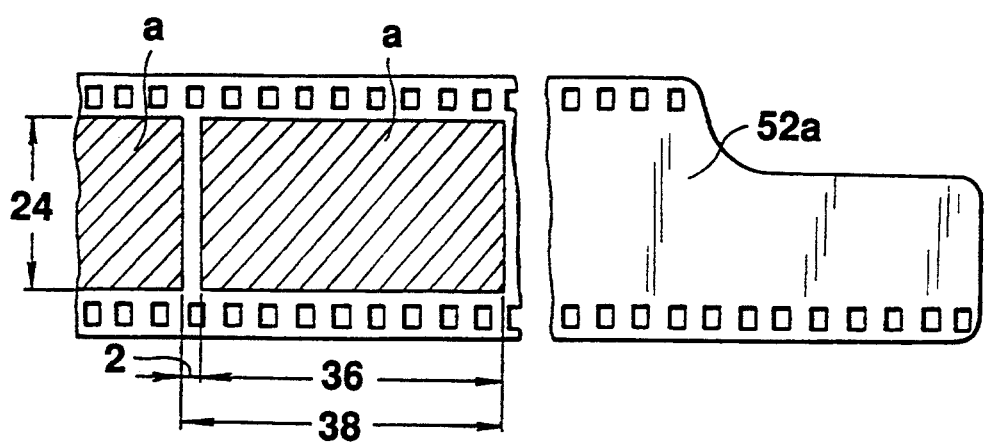
FIG. 20 is a front view showing photographic screens of a perforated film.

In FIG. 20, hatched areas represent screens a of a perforated normal film 52a that have been exposed. As shown in FIG. 20, the photographic screen size is 24 mm by 36 mm and the spacing separating photographic screens is 2 mm. Therefore, the film feed per frame will be 38 mm. For this perforated film, one frame is counted up in units of eight pulses originating from the contact springs 54a and 54b, and the film is fed with every count.

Alternatively, the diameters of detection rollers 22a and 22b may be determined so that when a film feed detection roller axis 22 rotates 2.7 turns, the pulse generation mechanism for film feed detection 60 will generate 16 pulses per film frame. Then, film feed control may be done based on a pulse signal sent from the pulse generation mechanism for film feed detection 60; that is, pulses originating from contact springs 63a and 63b.

Thereby, when a perforated film 52a is loaded, normal photography screens a are exposed in the same manner as that using a general camera.

Figure 21:
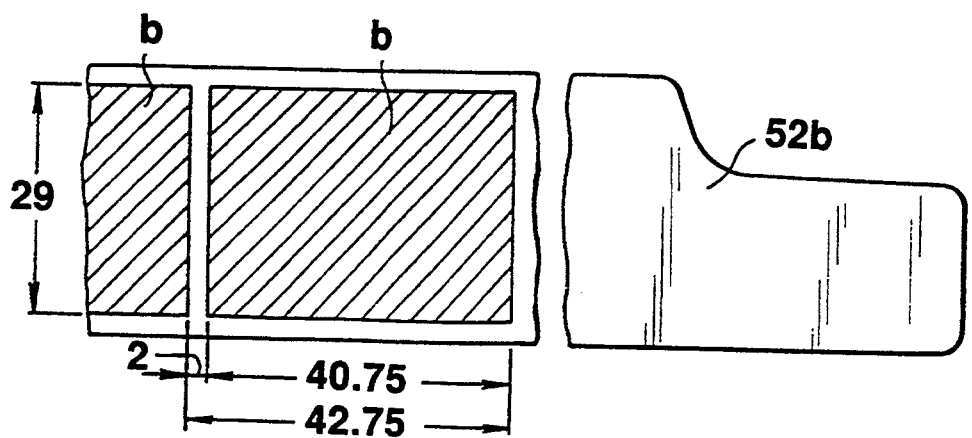
FIG. 21 is a front view showing photographic screens of an imperforated film.

In FIG. 21, hatched areas represent screens b of an imperforated film 52b that have been exposed. Assuming that the photographic screen size is 29 mm by 40.75 mm and the spacing of photographic screens is 2 mm, as shown in FIG. 21, the film feed per frame will be 42.75 mm. Therefore, when the diameters of the film feed detection rollers 22a and 22b are determined as described above, the detection rollers 22a and 22b rotate three turns for each film frame and the pulse generation mechanism 60 for film feed detection generates 18 pulses. Thus, the CPU 101 carries out film feed control according to a pulse signal from the pulse generation mechanism 60 for film feed detection 60 or pulses from the contact springs 63a and 63b.

The operation of CPU 101 will be described in conjunction with FIG. 18.

By a step S7, camera initialization terminates. The camera enters a release standby state (step S8). Then, when a release switch 102 is turned on, the CPU 101 outputs a control signal via an output pin P10 (See FIG. 16), and thereby actuates a shutter drive circuit 109 to open and close a shutter 110 (step S9). After that, a film advancing/rewinding motor 108 is rotated to feed film by one frame (step S10). At this time, the CPU 101 counts feed pulses as described previously to control the feed of the film according to a film feed specified at the step S7 (step S11).

Then, a film end is detected (step S12). At the step S12, when the film end is not detected, if the film still has unexposed frames, control returns to the step S8 to put the camera into the release standby state. On the other hand, when the film end is detected at the step S12, the CPU 101 issues an instruction to the film advancing/rewinding drive circuit 107 and thereby rewinds the film (step S13).

Figure 17:
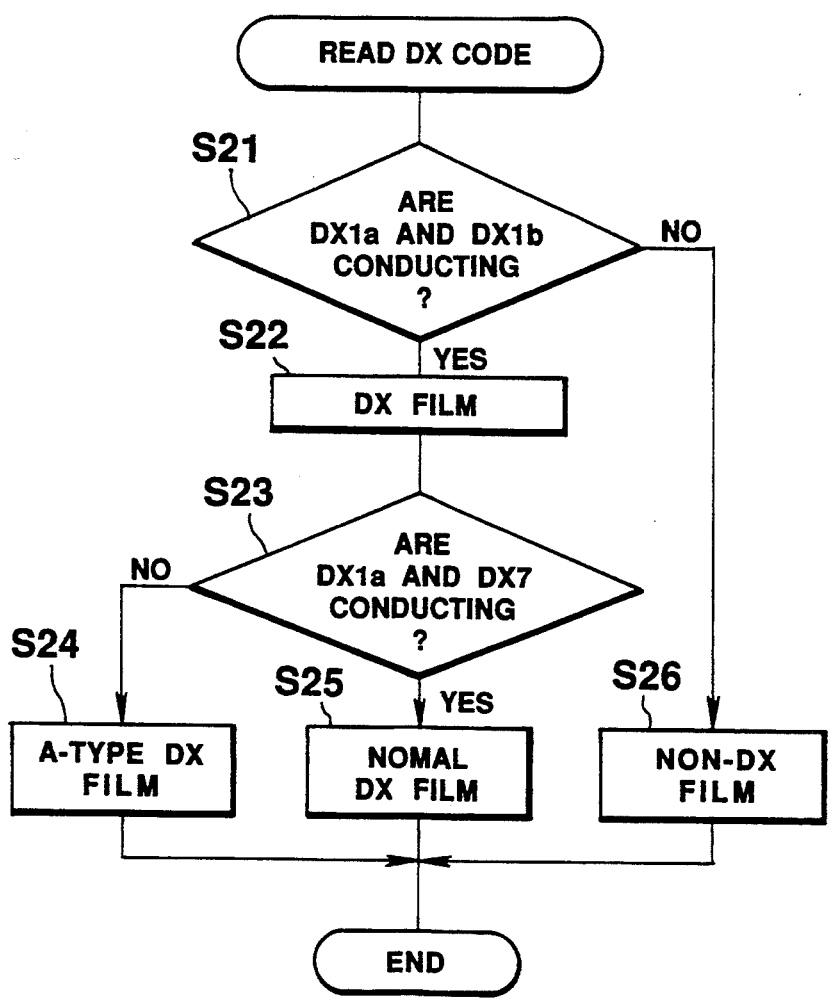
FIG. 17 is a flowchart showing an example of operation of a film type identifying means in the camera of the first embodiment.

In the first embodiment, either a normal DX film or a large-screen A-type DX film is identified by checking if an electrode L7 and an electrode L1 are conducting (See FIG. 17). Alternatively, when a contact DX7 that is brought into contact with the electrode area L7 comprises two contacts DX7a and DX7b (not shown), if a film type identifying means 84 incorporated in a CPU 101 includes an identifying means that checks the states of the two contacts DX7a and DX7b as well as the aforesaid identifying means (See FIGS. 16 and 17), a film of another type; such as, a film having perforations in such a rate as one perforation per one screen (hereafter, a B-type film) can be identified (See Table 7 below). In this kind of film, a perforation is created, for example, between two contiguous photographic screens, and the perforation is used as a film stoppage means. This provides large screens and improves film stopping accuracy.

TABLE 7

| Film type | Electrode area | |
|---|---|---|
| | 1 | 7 |
| Normal | 0 | 0 |
| A type | 0 | — |
| B type | — | 0 |

Figure 22:
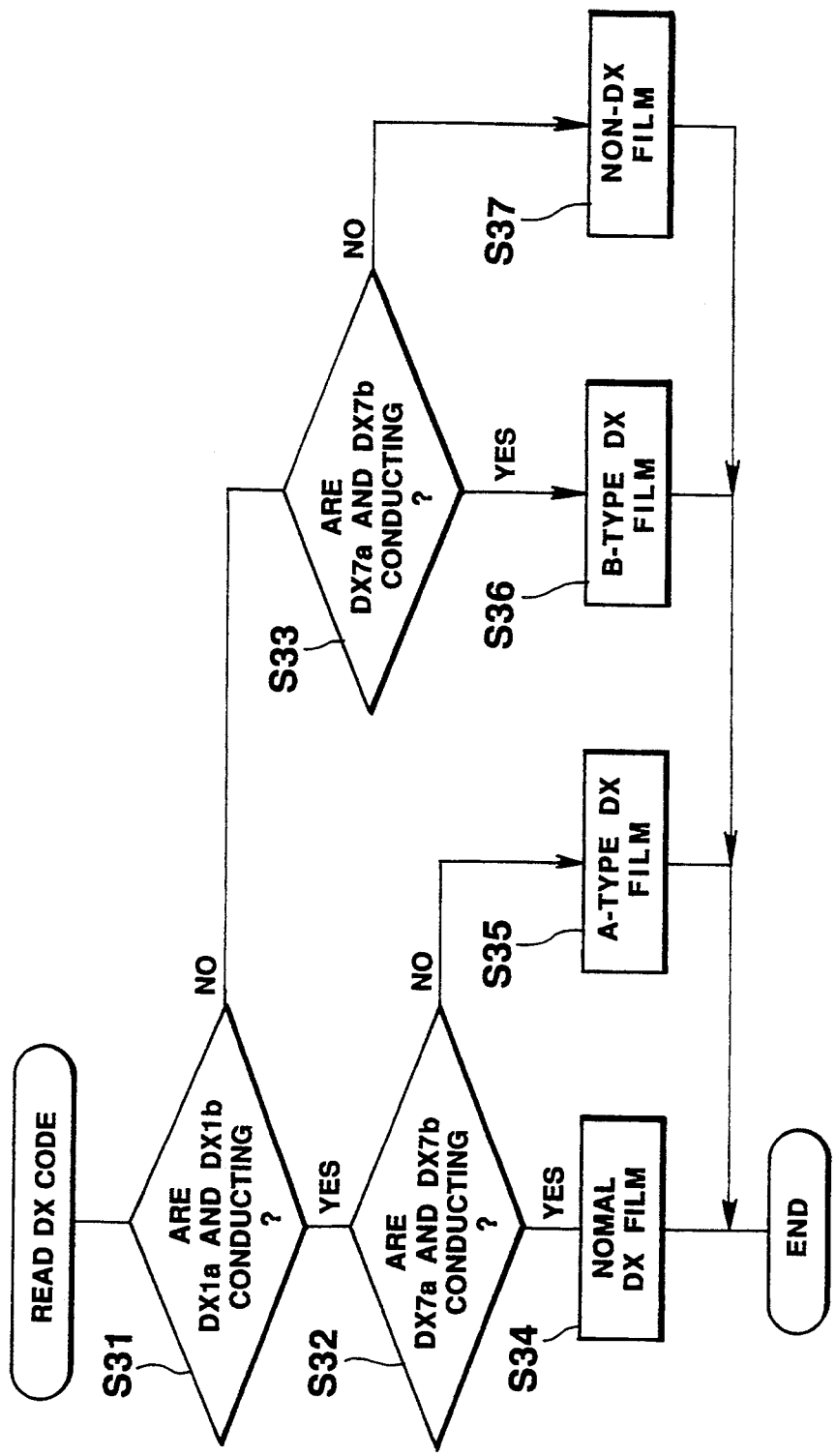
FIG. 22 is a flowchart showing an example of operation of the film type identifying means in the camera of the first embodiment.

FIG. 22 is a flowchart showing operation of a film type identifying means 84 in CPU 101 under the aforesaid conditions.

First, the CPU 101 determines whether contacts DX1a and DX1b are conducting similarly to the process shown in the flowchart of FIG. 17, and thereby becomes aware whether a film cartridge mounted in a camera body 1 has a DX code (step S31). At the step S31, if it is determined that the contacts DX1a and DX1b are conducting, the CPU 101 becomes aware that the contacts DX1a and DX7 are conducting or that an electrode L7 is conducting (step S32). At the step S32, if it is determined that the electrode L7 is a conductor, a perforated normal DX film is identified (step S34). If the electrode L7 is an insulator, an imperforated A-type DX film is identified (step S35).

At the step S31, if it is determined that the contacts DX1a and DX1b are non-conducting, the CPU 101 becomes aware that the contacts DX7b and DX7b are conducting or that the electrode L7 is conducting (step S33). At the step S33, if it is determined that the electrode L7 is conducting, a B-type DX film is identified (step S36). If the electrode L7 is an insulator, a normal non-DX film not having a DX code is identified (step S37).

Figure 23:
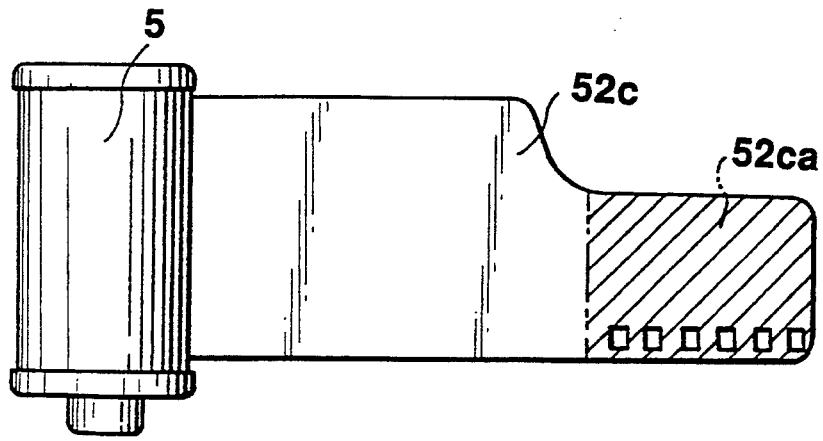
FIG. 23 is a front view showing a film of 35 mm wide that has perforations only in its leader.
Figure 24A:
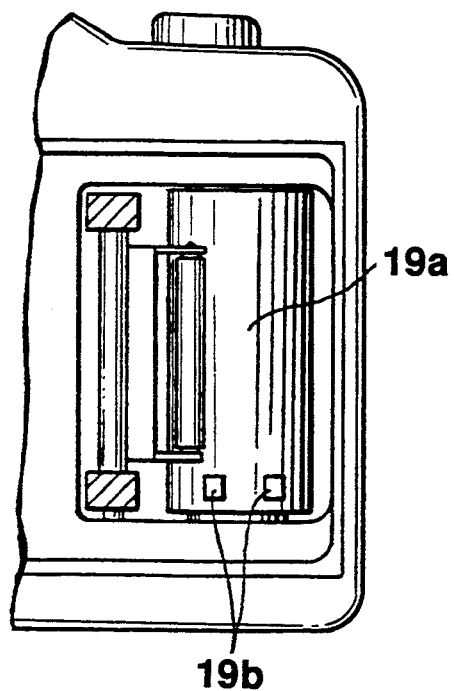
FIG. 24a is a front view showing a take-up spool for taking up the leader of the film shown in FIG. 23.
Figure 24B:
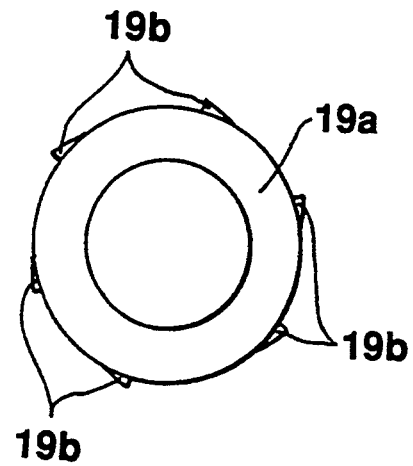
FIG. 24b is the cross-sectional diagram.
Figure 25A:
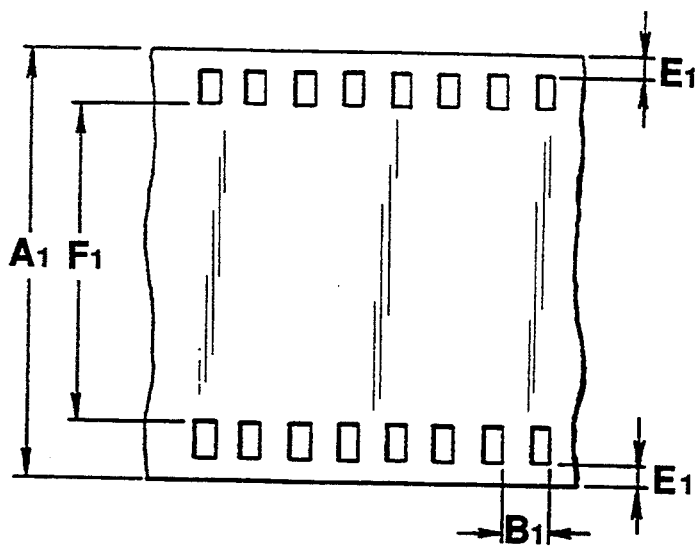
FIGS. 25a and 25b are front views showing dimensions of a perforated normal film.
Figure 25B:
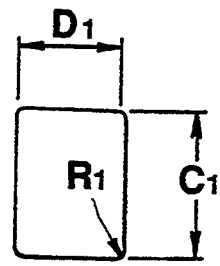

FIG. 23 shows a film 52c or an imperforated film having perforations only in its distal portion or leader 52ca for more reliable film loading, and a film cartridge 5 containing the film 52c. FIGS. 24a and 24b are explanatory diagrams for explaining a spool 19a or a spool 19 having film hitching claws 19b on its lower part. FIG. 24a is a back view of a film take-up chamber 29a in which the spool 19a is mounted. FIG. 24b is a cross-sectional diagram of the spool 19a.

When the film 52c is mounted in the camera body 1 and loaded, the perforations in the leader 52ca are hitched by the film hitching claws 19b formed on the spool 19a, and the film is wound up. This promises reliable loading.

Next, a camera of the second embodiment according to the present invention will be described.

The camera of the second embodiment has a means for correcting the number of exposed frames and a means for displaying the number of exposed frames in addition to the functions the camera of the first embodiment has.

Figure 26:
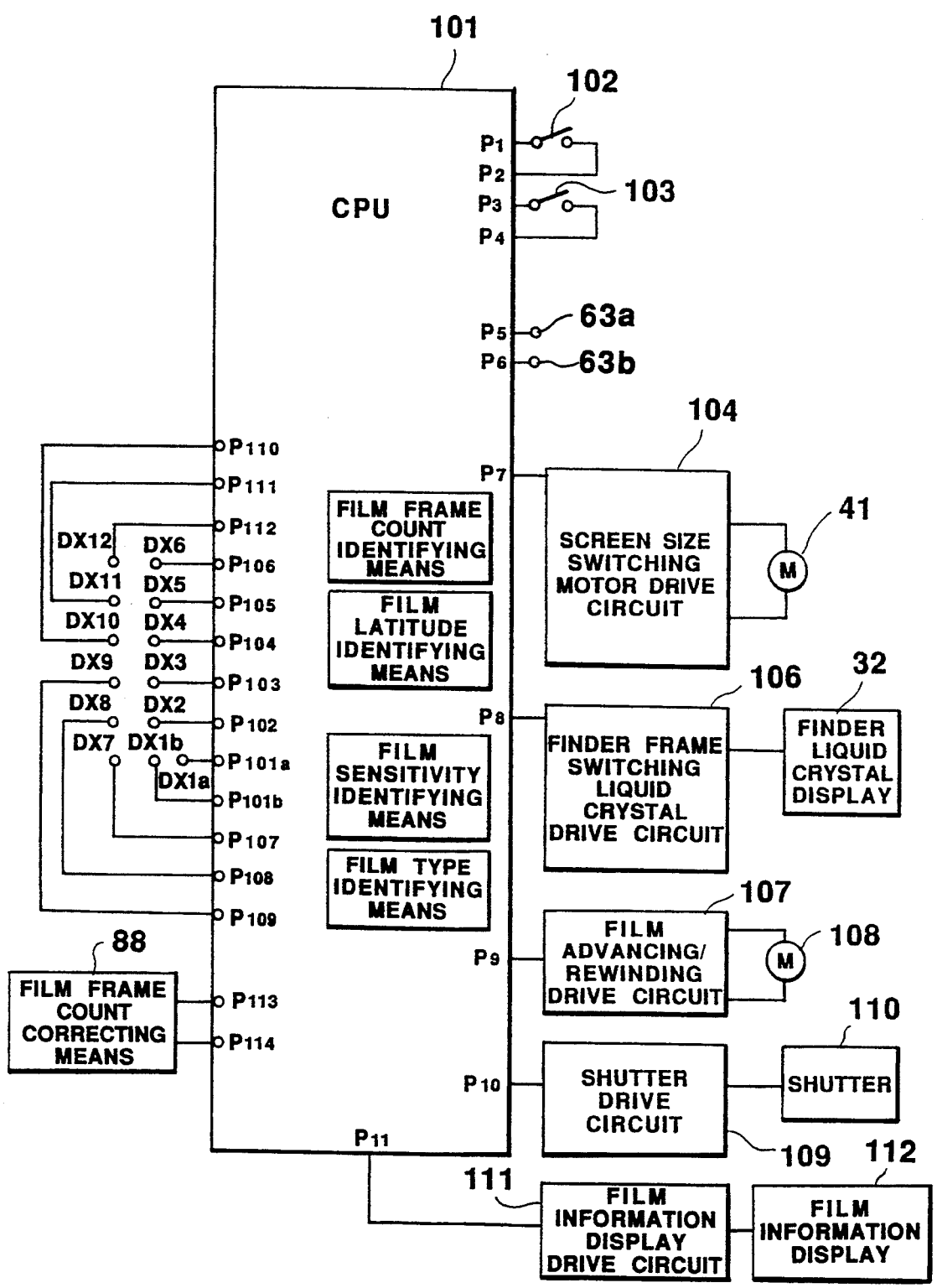
FIG. 26 is a block diagram showing a composition of electrical circuits in a camera of the second embodiment according to the present invention.

FIG. 26 is an electrical circuit diagram showing a composition of a CPU 101 for controlling the operation of a camera of this embodiment and its peripheral circuits.

The CPU 101 is a controller for controlling electric circuits in the camera of this embodiment. A release switch 102 is connected to input pins P1 and P2, and a back cover switch 103, to input pins P3 and P4. Switches formed with contact springs 63a and 63b are connected to input pins P5 and P6. The CPU 101 always monitors signals entering the input pins. When given signals enter the input pins, the CPU 101 operates accordingly (as will be described later).

A screen size switching motor drive circuit 104, a finder frame switching liquid crystal drive circuit 106, a film advancing/rewinding drive circuit 107, a shutter drive circuit 109, and a film information display drive circuit 111 are connected to output pins P7, P8, P9, P10, and P11 of the CPU 101. The CPU 101 processes signals entering the above-mentioned input pins to control these drive circuits.

The screen size switching motor drive circuit 104 has its output connected to a screen size switching motor 41 and thereby controls drive of the switching motor as described previously. The finder frame switching liquid crystal drive circuit 106 has its output connected to a transmission type liquid crystal plate 32 and thereby controls screen display of the transmission type liquid crystal plate 32. The film advancing/rewinding drive circuit 107 has its output connected to a film advancing/rewinding motor 108 and thereby controls drive of the motor 108. The shutter drive circuit 109 has its output connected to a shutter 110 and thereby controls opening and closing of the shutter 110.

The film information display drive circuit 111 has its output connected to a film information display 112 (See FIG. 28) and thereby controls drive of display information on the display 112 according to an instruction from the CPU 101.

Incorporated in the CPU 101 are a film frame count identifying means 81 for identifying the number of permissible film exposures such as a value listed in Table 3 using code information acquired from a DX code 5a, a film latitude identifying means 82 for identifying a film latitude such as a value listed in Table 4, a film sensitivity identifying means 83 for identifying a film sensitivity such as a value listed in Table 2, and a film type identifying means 84 for identifying a film type such as a value listed in Table 5.

These identifying means are connected to contacts DX1a and DX1b to DX12 via pins P101a and P101b to P112 of the CPU 101. That is to say, the contacts DX1a and DX1b to DX12 are connected to the pins P101a and P101b to P112 as shown in FIG. 26. Among them, the DX1a, DX1b, and DX7 are connected to the film type identifying means 84 via the pins P101a, P101b, and P107. The contacts DX2 to DX6 are connected to the film sensitivity identifying means 83 via the pins P102 to P106. The contacts DX8 to DX10 are connected to the film frame count identifying means 81 via the pins P108 to P110. The contacts DX11 and DX12 are connected to the film latitude identifying means 82 via the pins P111 and P112.

The film frame count identifying means 81 and film type identifying means 84 are connected to a film frame count correcting means 88 via pins P113 and P114.

Figure 27:
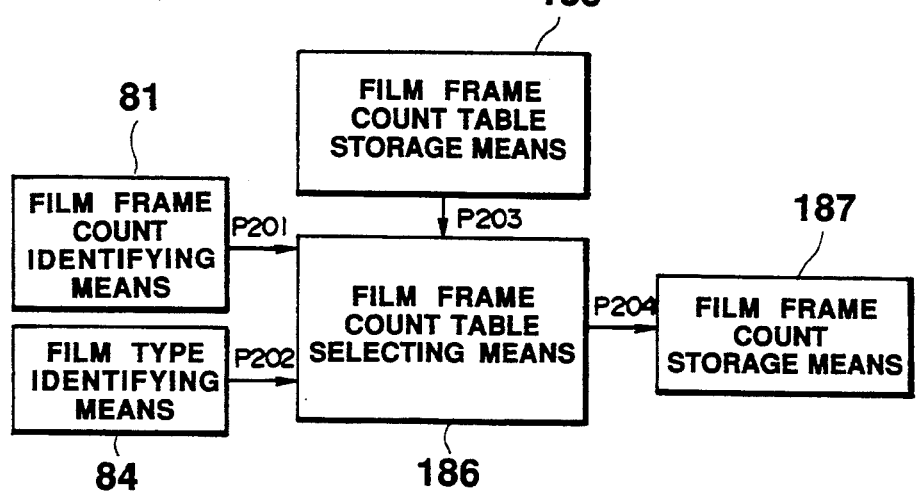
FIG. 27 is a block circuit diagram showing a configuration of a film frame count correcting means in the camera of the second embodiment.

FIG. 27 is a block diagram showing a configuration of the film frame count correction means 88. The film frame count correction means 88 comprises a film frame count table storage means 185, a film frame count table selecting means 186, and a film frame count storage means 187. The output pins of the film frame count identifying means 81 and film type identifying means 84 are connected to the input pins P201 and P202 of the film frame count table selecting means 186 via the pins P113 and P114 (See FIG. 26).

The film frame count table selecting means 186 has its input pin P203 connected to an output pin of the film frame count table storage means 185, and its output pin P204 connected to the film frame count storage means 187. With signals sent from the film frame count identifying means 81 and film type identifying means 84, the film frame count table selecting means 186 has information of a film loaded. Then, a table (See Table 8) existent in the table storage means 185 is referenced for data, so that the correct number of film frames will be stored in the film frame count storage means 187. The film frame count table selecting means 186 is not necessarily an independent circuit but may be implemented in the CPU 101.

| DX code of the number of frames | Number of normal DX film frames | Number of A-type DX film frames |
| --- | --- | --- |
| 12 | 12 | 10 |
| 20 | 20 | 17 |
| 24 | 24 | 21 |
| 36 | 36 | 32 |

The film frame count table storage means 185 is formed with a ROM making up, for example, a camera control circuit, and stores data of the numbers of film frames listed in Table 8.

The basis of having established the numbers of A-type film frames listed in Table 8 will be described.

In FIG. 20, hatched areas represent screens a of a normal perforated film 52a that have been exposed during photography. As shown in FIG. 20, the photographic screen size is 24 mm by 36 mm and the spacing of photographic screens is 2 mm. Therefore, the film feed per frame will be 38 mm. In FIG. 21, hatched areas represent screens b of an imperforated film 52b that have been exposed during photography. Assuming that the photographic screen size is, for example, 29 mm by 40.75 mm and the spacing of photographic screens is 2 mm, as shown in FIG. 21, the film feed per frame will be 42.75 mm. Then, the film feed for photography in the size of a screen b is 42.75/38 times as large as the film feed for photography in the size of a screen a. Therefore, the number of A-type film frames is provided as a multiple of an inverse number of the above division or a quotient of 38 by 42.75 with respect to the number of normal film frames. At this time, the decimal places are rounded down. Thus, the values listed in Table 8 are provided.

The film frame count storage means 187 is formed with a RAM or other storage cell. The information of the numbers of film frames existent in the storage means 187 is always posted to the CPU 101. In this case, the information of the number of film frames may be transmitted from the storage means 187 directly to the CPU 101, or to the CPU 101 via the film frame count table selecting means 186, which is not shown.

Figure 28:
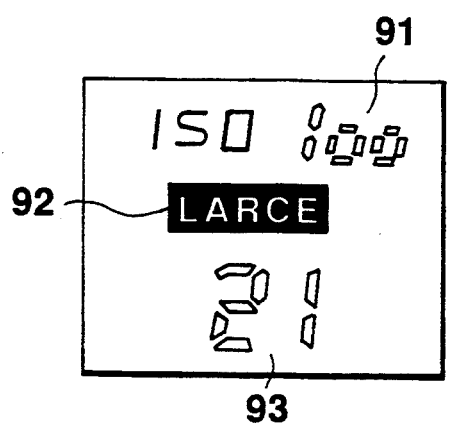
FIG. 28 is a front view showing an example of a display screen of a film information display in the camera of the second embodiment.

The film information display 112 (See FIG. 26) is formed with, for example, an LCD and formed outs/de the camera body 1. The film information display 112 has an ISO sensitivity display area 91, a photographic screen size display area 92, and a display area for the number of remaining permissible film exposures 93 (FIG. 28). The display information is controlled by the film information display drive circuit 111 that receives information from the CPU 101. For example, the number of frames in the display area for the number of remaining permissible film exposures 93 is, as described above, always posted to the CPU 101. Based on the information, the number of remaining film frames is displayed correctly. The display area for the number of remaining permissible film exposures 93 is not limited to display of the number of remaining permissible film exposures. Alternatively, using a switching means that is not shown, the display may be switched to the display of the current number of exposed frames.

Figure 29:
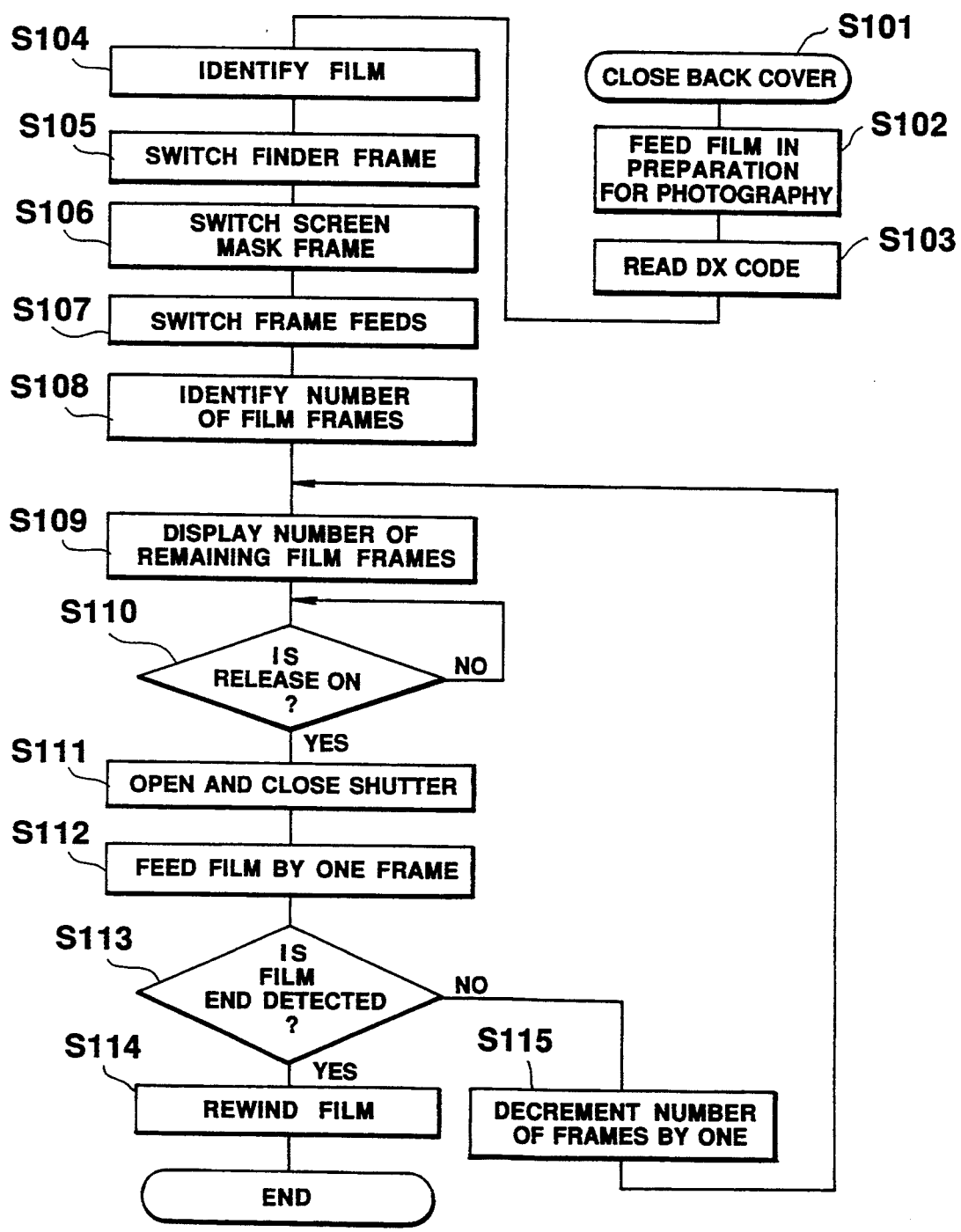
FIG. 29 is a flowchart showing operation of the camera of the second embodiment.

Next, the overall operation of a camera of this embodiment having the aforesaid configuration will be described with reference to the flowchart of FIG. 29.

First, a film cartridge 5 is mounted in a cartridge mounting chamber 11 of a camera body 1, a film 52 is pulled out from the film cartridge 5 to lie at a given position, then a back cover 26 is closed. Then, a back cover switch 103 is turned on to input an On signal to CPU 101 (step S101). Thereby, the CPU 101 outputs a control signal via an output pin P9. In response to the control signal, a film advancing/rewinding drive circuit 107 rotates film advancing/rewinding motor 108 to start feeding the film 52b in preparation for photography (step S102).

In the meantime, the CPU 101 reads information from a DX code section 5a on the film cartridge mounted (step S103). As described previously, the film sensitivity, number of permissible exposures, and latitude of the film stored in the film cartridge are recognized, and the presence or absence of perforations is detected (See the flowchart of FIG. 16) (step S104).

In response to the results, the CPU 101 outputs a control signal via an output pin P8 (See FIG. 26), actuates a finder frame switching liquid crystal drive circuit 106, and thus switches the displays of a transmission type liquid crystal plate 32 (step S105). At the same time, the CPU 101 outputs a control signal via an output pin P7 (See FIG. 26), actuates a screen size switching motor drive circuit 104 to rotate a screen size switching motor 41, and thus sets the photographic screen size to a given value (step S106).

When a film is imperforated, the CPU 101 instructs to select the screen display shown in FIG. 7a for the transmission type liquid crystal plate 32, and to increase the size of the mask produced by a photographic screen mask switching mechanism 40, or more particularly, to specify a mask size of 29 mm by 40.75 mm. Then, the CPU 101 instructs the film advancing/rewinding drive circuit 107 to increase the feed per frame for the film 52b (step S107).

Here, an example of setting a film feed will be described.

As described previously, when a normal perforated film 52a shown in FIG. 20 is employed for photography, the photographic screen size is 24 mm by 36 mm and the spacing between photographic screens is 2 mm. Therefore, the film feed per frame will be 38 mm. Under these conditions, the diameters of detection rollers 22a and 22b are defined so that a film feed detection roller axle 22 will rotate 2.7 turns and a pulse generation mechanism 60 for film feed detection will generate 16 pulses for each frame.

When an imperforated film 52b shown in FIG. 21 is used for photography, if the photographic size is set to 29 mm by 40.75 mm and the spacing of photographic screens is set to 2 mm, the film feed per frame will be 42.75. When the diameters of the film feed detection rollers 22a and 22b are defined as mentioned above, the detection rollers 22a and 22b rotate 3 turns for each film frame, and the pulse generation mechanism 60 for film feed detection generates 18 pulses.

Then, the CPU 101 issues instructions saying that the film 52b should be fed by one frame when the count of pulses generated by the pulse generation mechanism for film feed detection 60 becomes 18 (step S107).

When a perforated film 52a is loaded or a normal film cartridge is mounted, the CPU 101 instructs to select the screen display shown in FIG. 7b for the transmission type liquid crystal plate 32, and to shrink the masking frames of the photographic screen mask switching mechanism 40, or more particularly, to specify a mask size of 24 mm by 36 mm. At the same time, the CPU 101 instructs the film advancing/rewinding drive circuit 107 to reduce the feed per frame for the film 52a to such an extent that, as described above, the film 52a will be fed by one frame when the count of pulses generated by the pulse generation mechanism for film feed detection 60 becomes 16. Thus, when a normal film cartridge is mounted or a perforated film 52a is loaded, normal photographic screens a are exposed in the same manner as those exposed using a general camera.

The operation of a CPU 101 will be described in conjunction with FIG. 29.

After a step S107, the CPU 101 identifies the number of film frames existent in a film frame count storage means 187 using a film frame count table selecting means 186 or directly (step S108, See Table 8). Next, the CPU 101 compares the number of film frames identified with the number of exposed film frames and instructs the film information display 112 to display the number of remaining film frames (step S109).

By the step S109, camera initialization terminates. The camera enters a release standby state (step S110). Then, when a release switch 102 is turned on, the CPU 101 outputs a control signal via an output pin P10, and thereby actuates a shutter drive circuit 109 to open and close a shutter 110 (step S222). After that, the CPU 101 rotates film advancing/rewinding motor 108 to feed the film by one frame (step S112), then detects a film end of the film (step S113).

At the step S113, when the film end is not detected, if the film still has unexposed frames, the number of frames displayed in a display area for the number of remaining permissible film exposures 93 in the film information display 112 is decremented and displayed (step S115). Then, control returns to the step S109 to put the camera into the release standby state. On the other hand, if the film end is detected at the step S113, the CPU 101 issues an instruction to the film advancing-/rewinding drive circuit 107, and thereby rewinds the film (step S114).

In the present invention, it will be apparent that a wide range of different working modes can be formed on the basis of the invention without departing from the spirit and scope of the invention. This invention is not restricted to any specific embodiment but limited only by the appended claims.

What is claimed is:

1. A camera capable of accommodating a film cartridge having information including a film sensitivity, number of permissible exposures, and latitude of the built-in film displayed as first code data on its outer periphery, wherein:

said film cartridge is provided with second code data on its outer periphery identifying whether the built-in film is perforated or imperforated, and said camera includes means for reading Said data when the cartridge is placed in said camera and means for changing a finder field display responsive to said second code data obtained by said reading means.

2. A camera capable of accommodating a film cartridge having information about a built-in film including a film sensitivity, number of permissible exposures, and latitude of the built in film displayed as first code data on its outer periphery, wherein:

said film cartridge is provided with second code data on its Outer periphery identifying whether the built-in film is perforated or imperforated, and said camera includes means for reading Said data when the cartridge is placed in the camera and means for changing a photographic screen size, a finder field display, and a film feed amount according to said second code data Obtained by Said reading means.

3. A camera capable of accommodating a film cartridge having information about a film within the cartridge including a film sensitivity, number of permissible exposures, and latitude of the built-in film displayed as first code data on its outer periphery, wherein:

said film cartridge is provided with second code data on its outer periphery identifying whether the built-in film is perforated or imperforated, and said camera includes a means for reading said data when the cartridge is placed in the camera and means for changing a photographic screen size and a film feed amount according to said second code data Obtained by said reading means, and means for correcting said information of the number of permissible exposures responsive to a feeding of the film, and means for displaying a number of permissible exposures according to an output of said correcting means.

4. A camera according to claims 1, 2 or 3 wherein said second code data comprises a pair of electrode patterns having an exposed surface which is either a non-conducting or a conducting surface and said camera includes first and second reading means, said first reading means comprising one terminal for engaging one of said electrode patterns and said second reading means comprising a pair of terminals engaging another one of said electrode patterns, for determining information represented by said second code data.

5. A camera capable of accommodating a film cartridge having information including film sensitivity, number of permissible exposures, and latitude of a built-in film displayed as first code data on its outer periphery, wherein:
   said film cartridge is provided with second code data identifying whether the built-in film is perforated or imperforated; and
   said camera including means for reading said code data when said cartridge is mounted in the camera and means for changing a photographic size responsive to said second code data obtained from said reading means wherein:
   said second code data comprises a pair of electrode patterns having an exposed surface which is either a non-conducting or a conducting surface and said camera includes first and second reading means, said first reading means comprising one terminal for engaging one of said electrode patterns and said second reading means comprising a pair of terminals engaging another one of said electrode patterns, for determining information represented by said second code data.

6. A camera capable of accommodating a film cartridge having information including a film sensitivity, number of permissible exposures, and latitude of a built-in film displayed as first code data on its outer periphery, wherein:
   said film cartridge is provided with second code data identifying whether the built-in film is perforated or imperforated, and
   said camera includes means for reading said data when the cartridge is placed in said camera and means for changing a film feed amount responsive to said second code data obtained by said reading means wherein:
   said second code data comprises a pair of electrode patterns having an exposed surface which is either a non-conducting or a conducting surface and said camera includes first and second reading means, said first reading means comprising one terminal for engaging one of said electrode patterns and said second reading means comprising a pair of terminals engaging another one of said electrode patterns, for determining information represented by said second code data.

* * * * *